US012755595B2

(12) United States Patent
Ohashi et al.

(10) Patent No.: US 12,755,595 B2
(45) Date of Patent: Oct. 6, 2026

(54) BUSINESS SUPPORT SYSTEM AND BUSINESS SUPPORT METHOD

(71) Applicant: Glory Ltd., Hyogo (JP)

(72) Inventors: Tsuyoshi Ohashi, Himeji (JP); Koutarou Ooi, Himeji (JP); Takanori Tago, Himeji (JP)

(73) Assignee: GLORY LTD., Hyogo (JP)

( * ) Notice: Subject to any disclaimer, the term of this patent is extended or adjusted under 35 U.S.C. 154(b) by 186 days.

(21) Appl. No.: 18/495,761

(22) Filed: Oct. 27, 2023

(65) Prior Publication Data

US 2024/0054845 A1 Feb. 15, 2024

Related U.S. Application Data

(63) Continuation of application No. PCT/JP2022/018158, filed on Apr. 19, 2022.

(30) Foreign Application Priority Data

Apr. 28, 2021 (JP) ................................ 2021-076255

(51) Int. Cl.
*G07D 11/20* (2019.01)
*G06Q 10/0631* (2023.01)
*G06Q 20/20* (2012.01)

(52) U.S. Cl.
CPC ....... *G07D 11/20* (2019.01); *G06Q 10/06311* (2013.01); *G06Q 20/202* (2013.01)

(58) Field of Classification Search
CPC ...... G07D 11/20; G07D 11/24; G07D 11/245; G06Q 10/06311; G06Q 10/06;
(Continued)

(56) References Cited

U.S. PATENT DOCUMENTS

| | | | | |
|---|---|---|---|---|
| 8,640,945 | B1 | 2/2014 | McCormick | |
| 2018/0044112 | A1* | 2/2018 | Fujiwara | B65G 1/137 |
| 2018/0286163 | A1* | 10/2018 | Shimizu | G07D 11/245 |

FOREIGN PATENT DOCUMENTS

| | | | |
|---|---|---|---|
| CN | 103186833 | A | 7/2013 |
| JP | 2005-332093 | A | 12/2005 |

(Continued)

OTHER PUBLICATIONS

Valenzuela, Victor et al. Reusable hardware and software model for remote supervision of industrial Automation Systems using web technologies. IEEE Conferences, 2013. (Year: 2013).*

(Continued)

*Primary Examiner* — Fawaad Haider
(74) *Attorney, Agent, or Firm* — XSENSUS LLP

(57) ABSTRACT

A business support system includes an operator terminal carried by an operator, and a server capable of communicating with the operator terminal. The server includes an acceptor configured to accept task information including content of a task to be performed by the operator on a device and an identifier of the operator terminal, and a transmitter configured to transmit the task information to the operator terminal. The operator terminal includes a receiver configured to receive the task information, and a display configured to display the content of the task to be performed on the device, based on the task information received by the receiver.

18 Claims, 20 Drawing Sheets

(58) Field of Classification Search
CPC ... G06Q 10/063112; G06Q 10/063114; G06Q 10/103; G06Q 10/1097; G06Q 10/06316; G06Q 20/202; G06Q 20/20; G07F 19/20; G07G 1/00; G07G 1/14; Y02P 90/30
USPC ..................................................... 705/21
See application file for complete search history.

(56) References Cited

FOREIGN PATENT DOCUMENTS

| | | | |
|---|---|---|---|
| JP | 2006-146749 | A | 6/2006 |
| JP | 2006-285632 | A | 10/2006 |
| JP | 2008-139985 | A | 6/2008 |
| JP | 2018-180624 | A | 11/2018 |
| JP | 2021-060942 | A | 4/2021 |
| WO | 2016/142997 | A1 | 9/2016 |

OTHER PUBLICATIONS

International Search Report and Written Opinion mailed on Aug. 2, 2022, received for PCT Application PCT/JP2022/018158, filed on Apr. 19, 2022, 08 pages including English Translation.
Extended European Search Report issued Sep. 25, 2024 in European Patent Application No. 22795633.1.

* cited by examiner

FIG. 3

| OPERATOR | | AUTHENTICATION INFORMATION (PIN) | TASK DATE | OPERATOR TERMINAL | | ORDER | TARGET DEVICE | TASK CONTENT |
|---|---|---|---|---|---|---|---|---|
| NAME | ID | | | UNIT No. | IDENTIFIER | | | |
| A | 11111 | 123456789 | MARCH 1, 2021 | 1 | 234567891 | 1 | FIRST MONEY CHANGE MACHINE A | COLLECTION |
| | | | | | | 2 | MONEY DEPOSITING/ DISPENSING MACHINE | DEPOSIT |

FIG. 16

| OPERATOR | | AUTHENTICATION INFORMATION (PIN) | TASK DATE | OPERATOR TERMINAL | | ORDER | STORE | TARGET DEVICE | TASK CONTENT |
|---|---|---|---|---|---|---|---|---|---|
| NAME | ID | | | UNIT No. | IDENTIFIER | | | | |
| B | 22222 | 987654321 | MAY 1, 2021 | 2 | 876543219 | 1 | X | FIRST MONEY DEPOSITING/ DISPENSING MACHINE A | COLLECTION |
| | | | | | | 2 | X | SECOND MONEY DEPOSITING/ DISPENSING MACHINE B | COLLECTION |
| | | | | | | 3 | Y | MONEY DEPOSITING/ DISPENSING MACHINE C | COLLECTION |

BUSINESS SUPPORT SYSTEM AND BUSINESS SUPPORT METHOD

CROSS-REFERENCE AND PRIORITY INFORMATION

The present application is a continuation of PCT/JP2022/018158, filed Apr. 19, 2022, which claims priority to JP 2021-076255, filed Apr. 28, 2021, and the contents of each of which are incorporated by reference in their entirety.

TECHNICAL FIELD

The present disclosure relates to a business support system and a business support method.

BACKGROUND

In stores in commercial facilities, such as convenience stores and supermarkets, it is conventional that money change machines and point of sale (POS) registers are installed in a front area of the store where customers can enter and a money depositing/dispensing machine such as a teller machine for depositing money collected from each money change machine is installed in a back office area of the store where customers are not allowed to enter. When a customer conducts a checkout process, a cashier of the store operates these money change machine and POS register to deposit money received from the customer as payment for merchandise into the money change machine and/or to dispense money as change from the money change machine and return it to the customer. The money depositing/dispensing machine installed in the back office area is able to execute a process of depositing money as sales proceeds collected from the money change machines. Additionally, when a money change machine is running short of money as change, money can be dispensed from the money depositing/dispensing machine as change replenishment money, so that the money change machine can be replenished with such money as the change replenishment money dispensed from the money depositing/dispensing machine.

In places where cash is handled, such as in stores in commercial facilities, unauthorized operations are likely to occur, which may force managers to spend a great deal of time and effort in monitoring operations and dealing with a situation's aftermath.

Meanwhile, in another system, the other system may be configured as follows with the aim of providing a system that reliably and efficiently implements an authentication process between a device subject to maintenance work and a person in charge of the work and ensures work management. That is, a copier retains a device identifier that identifies the device and an authentication code. The copier encodes the device identifier into an image code and displays it.

A portable information terminal device obtains the image displayed on the copier and decodes it. The portable information terminal device transmits the decoded device identifier and information identifying the terminal device to a management server device. In response to this information, the management server device retrieves stored work permission information for the copier, encodes it into an image code, and transmits it to the portable information terminal device. The portable information terminal device receives and displays the image-encoded work permission information. The copier obtains the information displayed on the portable information terminal device and determines whether or not it satisfies a predetermined relationship to the authentication code.

SUMMARY

In an exemplary implementation of the present application, a business support system, comprises an operator terminal; and a server including circuitry configured to accept task information including content of a task to be performed on a device and an identifier of the operator terminal; and transmit the task information to the operator terminal, wherein the operator terminal comprises circuitry configured to receive the task information; and control a display to display the content of the task to be performed on the device, based on the received task information.

BRIEF DESCRIPTION OF DRAWINGS

FIG. 3 shows example information stored in a memory.

FIG. 16 shows example information stored in a memory.

DETAILED DESCRIPTION

Figure 1:
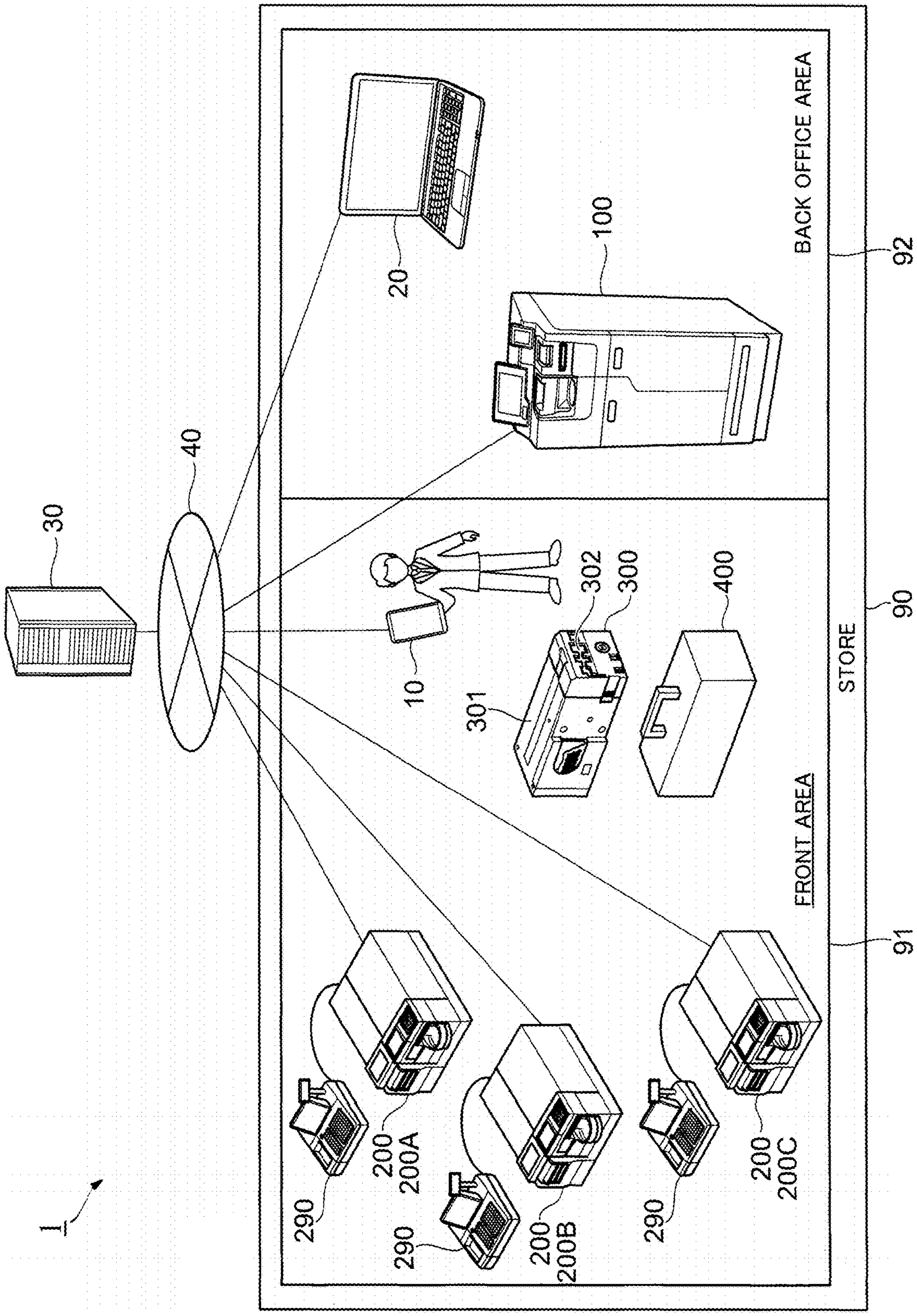
FIG. 1 shows an example schematic configuration of a business support system according to a first embodiment.

The inventors of the present disclosure have recognized problems with conventional systems. For example, operators involved in tasks of managing cash and important items need to learn various operations on a wide variety of equipment, which can easily lead to operational errors. In addition, if operators are frequently replaced or foreign workers are frequently hired as operators at, e.g., a store in a commercial facility where such tasks are required, the cost of training operators for these operations will be a significant burden.

The inventors have developed the technology of the disclosure in order to provide a business support system and the like that can teach task content to operators. In one aspect, a business support system comprising: an operator terminal; and a server capable of communicating with the operator terminal. The server comprises: an acceptor configured to accept task information including content of a task to be performed on a device and an identifier of the operator terminal; and a transmitter configured to transmit the task information to the operator terminal. The operator terminal comprises: a receiver configured to receive the task information; and a display configured to display the content of the task to be performed on the device, based on the task information received by the receiver.

The operator terminal may further comprise an output configured to output a task signal based on the task information received by the receiver, and the device may comprise a reader configured to read the output task signal from the output, and may be configured to execute a process identified by the task signal read by the reader.

The device may comprise an obtainer configured to obtain process information transmitted from the server, the process information including content of a task, and the device may be configured to execute a process included in the process information when content of a task identified by the task signal read by the reader matches content of a task identified by the process information obtained by the obtainer.

The output may be configured to output the task signal including operator information for identifying an operator who carries the operator terminal, and the device may be configured to execute the process when the operator information included in the task signal read by the reader is proper.

The device may comprise an obtainer configured to obtain process information transmitted from the server, the process information including content of a task and operator information for identifying an operator who carries the operator terminal, and the device may be configured to execute the process when the operator information obtained by the obtainer matches the operator information included in the task signal read by the reader.

The device may be configured to transmit results of execution of the process to the server. The acceptor may be configured to accept input regarding content of plural tasks. The acceptor may be configured to accept input regarding an order in which the plural tasks are to be performed. The device may comprise a plurality of the devices, and the acceptor may be configured to accept content of the task to be performed on each of the plurality of the devices.

In another aspect, the present disclosure provides a business support method comprising steps of: accepting content of a task to be performed by an operator on a device and an identifier of an operator terminal carried by the operator; transmitting task information including the content of the task to the operator terminal; and displaying, by the operator terminal, the content of the task to be performed on the device, based on the received task information.

The method may further comprise steps of: outputting, by the operator terminal, a task signal including the identifier based on the received task information; reading, by the device, the task signal; obtaining, by the device, process information including content of a process; and executing, by the device, a process included in the process information when the identifier included in the task signal matches the identifier included in the process information. The method may further comprise steps of: obtaining, by the device, process information including content of a process; and executing, by the device, a process included in the process information when content of a task identified by the task signal matches content of a task identified by the process information.

Embodiments will now be described in detail with reference to the drawings.

First Embodiment

FIG. 1 shows an example schematic configuration of a business support system 1 (which may be referred to hereinafter simply as the "system 1") according to a first embodiment.

The system 1 includes an operator terminal 10 carried and used by an operator, a manager terminal 20 used by a manager who manages the operators, and a business support server 30 (which may be referred to hereinafter simply as the "server 30") that supports business operations of the operators.

In the present embodiment, the system 1 is a system that supports business operations of operators involved in tasks at a store 90 in a commercial facility and includes multiple money change machines 200 and POS registers 290 installed in a front area 91, where customers can enter, and a money depositing/dispensing machine 100 installed in a back office area 92, where customers are not allowed to enter. In the present embodiment, merchandise shelves displaying various kinds of merchandise as well as three money change machines 200 and three POS registers 290 are installed in the front area 91. The three money change machines 200 include a first money change machine 200A, a second money change machine 200B, and a third money change machine 200C.

For example, the operator terminal 10 may be as a portable terminal such as a multifunctional cell phone (so-called "smart phone"), portable information terminal (PDA), tablet terminal, tablet PC, laptop PC, etc.

For example, the manager terminal 20 may be a laptop PC, desktop PC, tablet PC, tablet terminal, portable information terminal, multifunctional cell phone, cell phone, etc.

The operator terminal 10, the manager terminal 20, the money depositing/dispensing machine 100, and the money change machines 200, and the server 30 can communicate with each other via a network 40. The network 40 may be any communication network used for inter-device data communication, which may be, for example, the Internet, a wide area network (WAN), or a local area network (LAN). The communication lines used for data communication may be either wired or wireless, and both may be used together. The wireless LAN may be, for example, WiFi®.

In the system 1 configured as described above, the manager can register task content for an operator with the server 30 via the manager terminal 20. The server 30 transmits the task content registered in association with the operator to the operator terminal 10 carried by the operator. The operator can know the task content by viewing the operator terminal 10. In addition, the server 30 transmits process content corresponding to the task content registered in association with the operator, along with an identifier of the operator terminal 10 carried by the operator, to devices that are communicatively connected to each other via the network and on which the operator is to perform the relevant task, i.e., the money depositing/dispensing machine 100 and the money change machines 200 in the present embodiment. Upon reading code information displayed on the operator terminal 10, each device executes the process that is stored in association with the identifier of the operator terminal 10.

The configurations and operations of the operator terminal 10, the manager terminal 20, the server 30, the money depositing/dispensing machine 100, the money change machine 200, and the POS register 290 are described in detail below.

(Operator Terminal 10)

Figure 2:
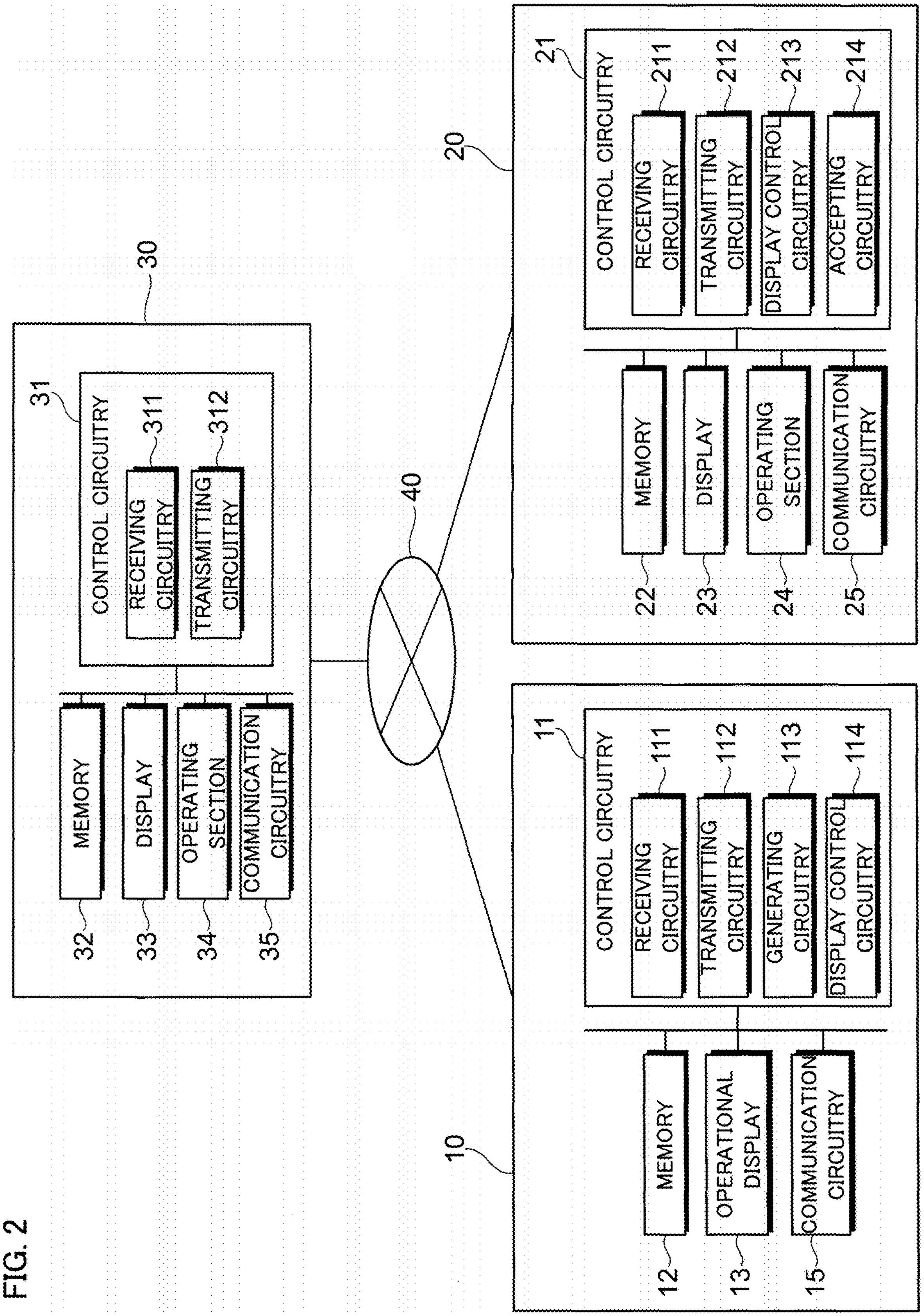
FIG. 2 shows example schematic configurations of an operator terminal, a manager terminal, and a server.

FIG. 2 shows example schematic configurations of the operator terminal 10, the manager terminal 20, and the server 30.

The operator terminal 10 includes control circuitry 11 for controlling the entire device and a memory 12 used to store data and other information. For example, the memory 12 may be a storage device such as a semiconductor memory. The operator terminal 10 further includes an operational display 13 capable of displaying operation reception screens and images and accepting input operations from the operator, and communication circuitry 15, such as a communication interface, used for communication with the server 30. For example, the operational display 13 may be a touch panel that combines a display device for displaying still and moving images and a position input device.

The control circuitry 11 may include a CPU, a ROM, and a RAM. The ROM stores the basic program (operation system) executed by the CPU as well as various settings and other information. The CPU uses the RAM as its working area and executes application programs loaded from the ROM or the memory 12. For example, the CPU executes an application program for supporting business operations (which may be referred to hereinafter as a "business support application") loaded from the ROM or the memory 12.

The control circuitry 11 includes receiving circuitry 111 for receiving information transmitted from the server 30, transmitting circuitry 112 for transmitting information to the server 30, generating circuitry 113 for generating code information based on the information received by the receiving circuitry 111, and display control circuitry 114 for controlling the operational display 13. The receiving circuitry 111 is able to receive information transmitted from the server 30 while being connected to the server 30 via the network 40, and the control circuitry 11 can start the business support application in response to the receiving circuitry 111 receiving information from the server 30. For example, the code information may be a QR Code® or a bar code.

For example, the operator terminal 10 may be lent to an operator at, e.g., the start of his/her operation for the day and returned after the end of the operation.

(Manager Terminal 20)

The manager terminal 20 includes control circuitry 21 for controlling the entire device, a memory 22 used to store data and other information, a display 23 used to display operation reception screens and images, an operating section 24 for accepting user input operations, and communication circuitry 25 used for communication with the server 30. The memory 22 and the communication circuitry 25 are similar to the memory 12 and the communication circuitry 15 of the operator terminal 10, respectively. For example, the display 23 may be a liquid crystal display or an organic EL display. For example, the operating section 24 may be composed of buttons, switches, a touch panel, and/or other input devices. The display 23 and the operating section 24 may be integrated into a single component, similarly to the operational display 13 of the operator terminal 10.

The control circuitry 21 may include a CPU, a ROM, and a RAM. The ROM stores the basic program (operation system) executed by the CPU as well as various settings and other information. The CPU uses the RAM as its working area and executes application programs loaded from the ROM or the memory 22. For example, the CPU executes the business support application loaded from the ROM or the memory 22.

The control circuitry 21 includes receiving circuitry 211 for receiving information transmitted from the server 30, transmitting circuitry 212 for transmitting information to the server 30, display control circuitry 213 for controlling display on the display 23, and accepting circuitry 214 for accepting input regarding task content for operators.

The accepting circuitry 214 accepts input regarding various kinds of information from the manager. For example, the accepting circuitry 214 accepts information entered by the manager in predetermined input fields displayed on the display 23 as task content. In addition, the accepting circuitry 214 accepts input regarding the following information from the administrator. For example, the manager starts the business support application installed on the manager terminal 20 and enters various kinds of information by operating the operating section 24. For example, the manager enters an identifier of an operator terminal 10 lent to an operator and an identifier of an operator terminal 10 returned from an operator. The manager also enters task content for an operator and the date on which the task is to be performed. When entering the task date, the manager can also enter the time of day at which the operator is to perform the task. The manager also enters commands or a command group for each device or a command group for multiple devices. For example, the command group may refer to a collection of a target device(s) on which to perform a task(s) and commands for such device(s), which is put together to correspond to a workflow of an operator. The manager also enters an event and a command for that event or a command group that is a collection of commands for that event.

The receiving circuitry 211 is able to receive information transmitted from the server while being connected to the server 30 via the network 40, and the control circuitry 21 is able to start the business support application in response to the receiving circuitry 211 receiving information from the server 30.

(Server 30)

The server 30 includes control circuitry 31 for controlling the entire device, a memory 32 used to store data and other information, a display 33 used to display operation reception screens and images, an operating section 34 for accepting user input operations, and communication circuitry 35 used for communication with the operator terminal 10 and the manager terminal 20. For example, the memory 32 may be a semiconductor memory or a hard disk drive (HDD). The display 33, the operating section 34, and the communication circuitry 35 are similar to the display 23, the operating section 24, and the communication circuitry 25 of the manager terminal 20, respectively.

The control circuitry 31 may include a CPU, a ROM, and a RAM. The control circuitry 31 includes receiving circuitry 311 for receiving information transmitted from the operator terminal 10, the manager terminals 20, and devices (e.g., the money depositing/dispensing machines 100), and transmitting circuitry 312 for transmitting information to the operator terminal 10, the manager terminal 20, and the devices.

The memory 32 stores the name, ID, authentication information, and authorization category of the manager in association with each other. The memory 32 also stores the name, ID, and authentication information of each operator in association with each other. For example, the authentication information may be a PIN or biometric information. The biometric information may be face or fingerprint information, for example. The memory 32 also stores an identifier of each operator terminal 10. For example, the identifier may be a MAC address. The memory 32 also stores information about each device and process content to be executed by each device in association with each other.

FIG. 3 shows example information stored in the memory 32.

As shown in FIG. 3, the memory 32 stores each operator's name, ID, authentication information, task date, an identifier of the operator terminal 10 carried by the operator, and task content in association with each other. The information shown in FIG. 3 is information that has been entered in predetermined input fields, which are displayed on the display 23 in response to the manager operating the manager terminal 20 and starting the business support application, and thus accepted by the accepting circuitry 214 and transmitted by the transmitting circuitry 212. In other words, this is the information registered by the manager using the manager terminal 20. By way of example, a command "execute a collection process" for the first money change machine 200A and a command "execute a deposit process" for the money depositing/dispensing machine 100, which correspond to a collection task on the first money change machine 200A and a deposit task on the money depositing/dispensing machine 100 shown in FIG. 3, respectively, are a command group described above. The memory 32 also stores command groups registered by the manager.

(Money Depositing/Dispensing Machine 100)

Figure 4:
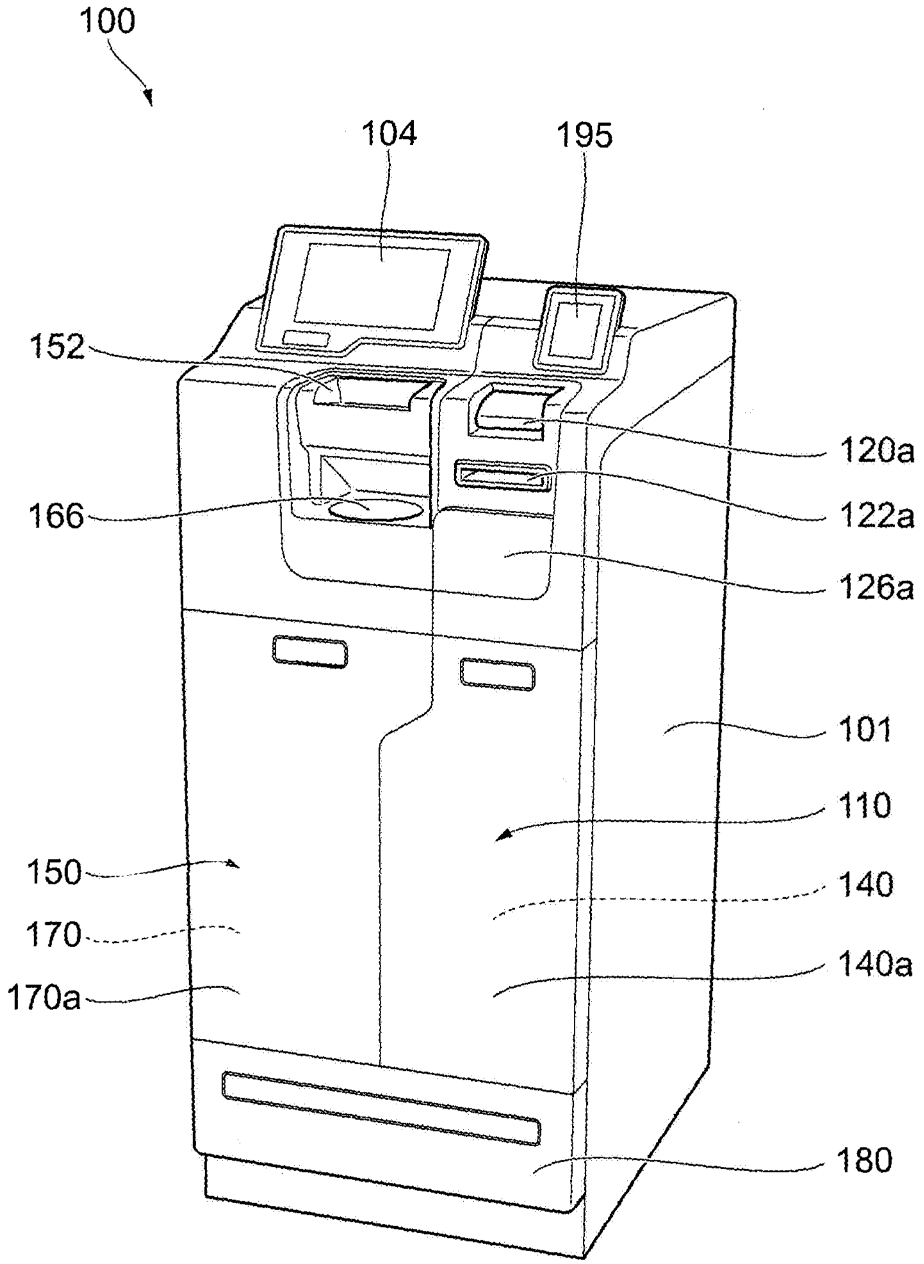
FIG. 4 shows an example schematic configuration of a money depositing/dispensing machine.
Figure 5:
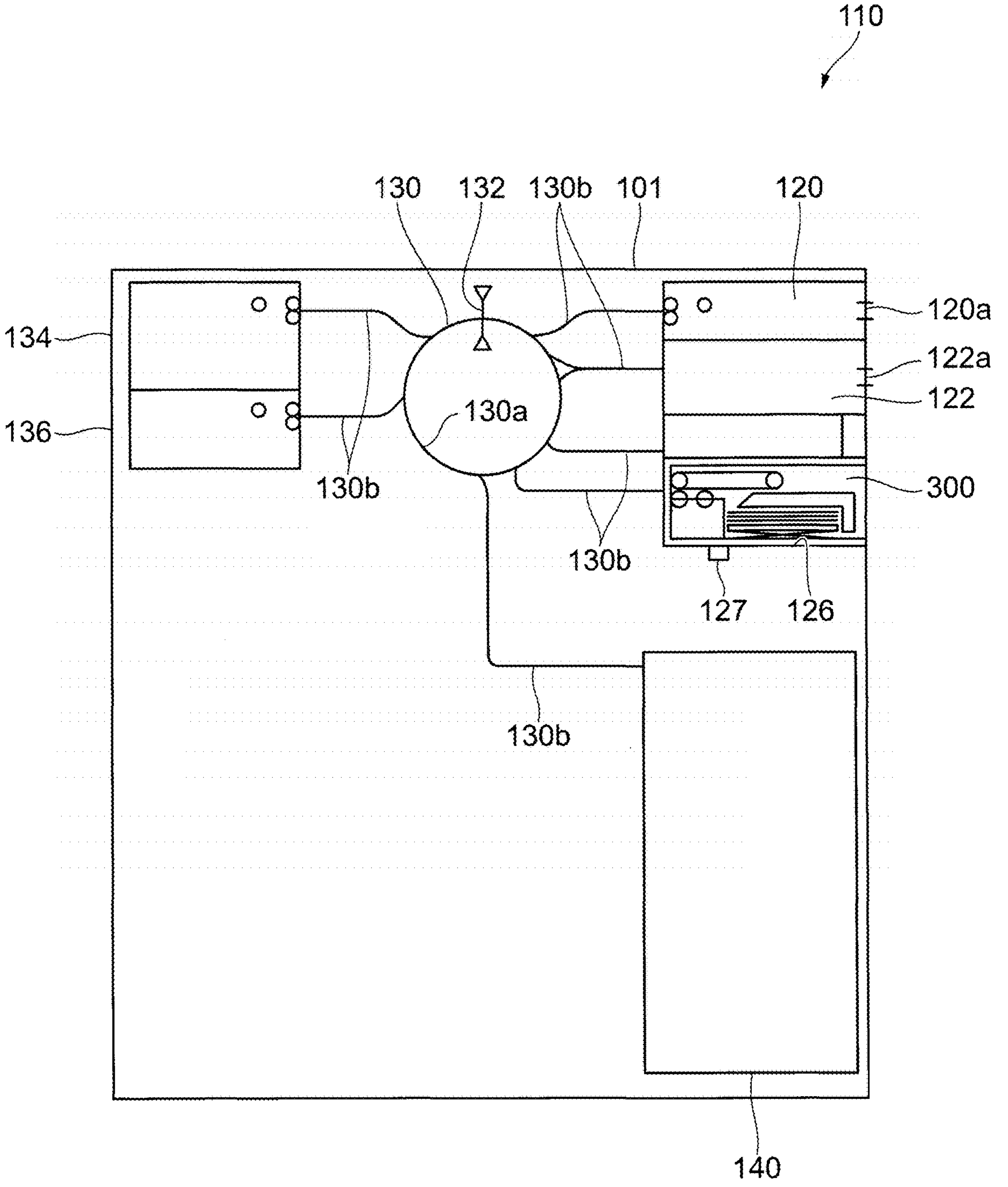
FIG. 5 shows an example schematic configuration of the money depositing/dispensing machine.

FIGS. 4 and 5 show an example schematic configuration of the money depositing/dispensing machine 100.

Figure 6:
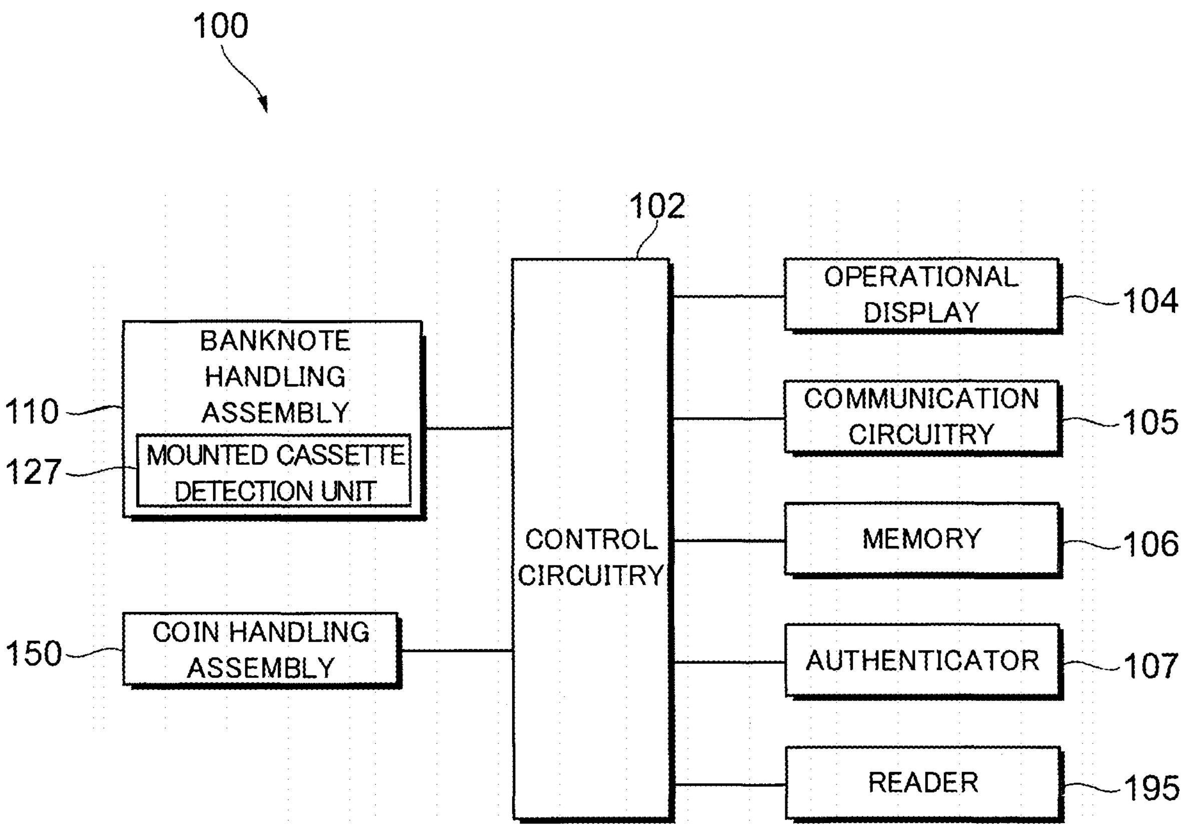
FIG. 6 shows an example block diagram of the money depositing/dispensing machine.

FIG. 6 shows an example block diagram of the money depositing/dispensing machine 100.

As shown in FIG. 4, the money depositing/dispensing machine 100 includes a banknote handling assembly 110 for depositing and dispensing banknotes, a coin handling assembly 150 for depositing and dispensing coins, and a coin-roll storage assembly 180 for storing coin-rolls, all of which are accommodated in a generally cuboid housing 101. As shown in FIG. 4, the banknote handling assembly 110 and the coin handling assembly 150 are disposed side-by-side as viewed from the front side of the money depositing/dispensing machine 100. The money depositing/dispensing machine 100 also includes a reader 195 for reading code information.

The banknote handling assembly 110 includes a banknote receiving unit 120, a banknote dispensing unit 122, a transport unit 130, and a plurality of banknote storage units 134 and 136. The banknote handling assembly 110 further includes a cassette mounting unit 126 for detachable mounting of a storage cassette 300 (described below).

The transport unit 130 includes a round transport unit 130*a* and a plurality of connecting transport units 130*b*. The round transport unit 130*a* is provided with a recognition unit 132 for recognizing a denomination, authenticity, fitness, face-up/face-down, a version, a transportation state, etc. of the banknotes transported by the round transport unit 130*a*.

The front face of the housing 101 is provided with a banknote inlet 120*a* and a banknote outlet 122*a*. The cassette mounting unit 126 is provided on its front side with a door 126*a*, which is opened to allow a storage cassette 300 to be mounted on the cassette mounting unit 126 or to be removed from the cassette mounting unit 126. The cassette mounting unit 126 is provided with a mounted cassette detection unit 127, such as an optical sensor, for detecting mounting of the storage cassette 300 on the cassette mounting unit 126.

A collecting cassette 140 is accommodated in a lower space inside the housing 101, and banknotes to be collected by a security company are stored in the collecting cassette 140. The collecting cassette 140 is provided on its front side with a door 140*a*, which is opened to allow the collecting cassette 140 to be accommodated inside the housing 101 or to be removed from the housing 101.

The coin handling assembly 150 includes a coin receiving unit 152, a coin dispensing unit 166, and a plurality of storage/feeding units that can store coins inside the housing 101 and feed the stored coins.

A collecting cassette 170 is accommodated in a lower space inside the housing 101, and coins to be collected by a security company are stored in the collecting cassette 170. The collecting cassette 170 is provided on its front side with a door 170*a*, which is opened to allow the collecting cassette 170 to be accommodated inside the housing 101 or to be removed from the housing 101.

The money depositing/dispensing machine 100 includes control circuitry 102 inside the housing 101. The control circuitry 102 controls the banknote handling assembly 110, the coin handling assembly 150, etc. The control circuitry 102 may include a CPU, a ROM, and a RAM. The mounted cassette detection unit 127 is connected to the control circuitry 102, and information indicative of the detection of the storage cassette 300 by the mounted cassette detection unit 127 is transmitted to the control circuitry 102.

Also connected to the control circuitry 102 are an operational display 104, communication circuitry 105, a memory 106, an authenticator 107, and a reader 195.

The operational display 104 comprises a touch panel or the like provided on an upper part of the housing 101, and an operational screen to be operated by the operator and information about the amount of money stored are displayed on the operational display 104. On the operational display 104, the operator can input various commands to the control circuitry 102 by touching operation buttons on the operation screen with his/her finger.

The authenticator 107 is configured to authenticate the operator information (e.g., ID), authority, etc. of the operator operating the money depositing/dispensing machine 100. Specifically, for example, in the case where the operator is required to enter his/her own operator information and PIN on the operational display 104, the authenticator 107 authenticates the operator information, authority, etc. of the operator based on the operator information and PIN of the operator entered on the operational display 104. As the authenticator 107, a card reader for reading an ID card or the like held by the operator may be provided to the money depositing/dispensing machine 100. In this case, the authenticator 107 authenticates the operator information, authority, etc. of the operator based on the information read from the ID card or the like by the card reader.

For example, the reader 195 may be any known bar code reader that reads QR Codes® or bar codes as an example of the code information. For example, the reader 195 reads the code information displayed on the operational display 13 of the operator terminal 10. The control circuitry 102 obtains information such as an identifier of the operator terminal 10 included in the code information read by the reader 195.

While FIG. 4 illustrates the operational display 104 and the reader 195 as being distinct components, the operational display 104 and the reader 195 may be integrated into a single component. For example, the operational display 104 may have the function of reading the code information.

(Money Change Machine 200 and POS Register 290)

Figure 7:
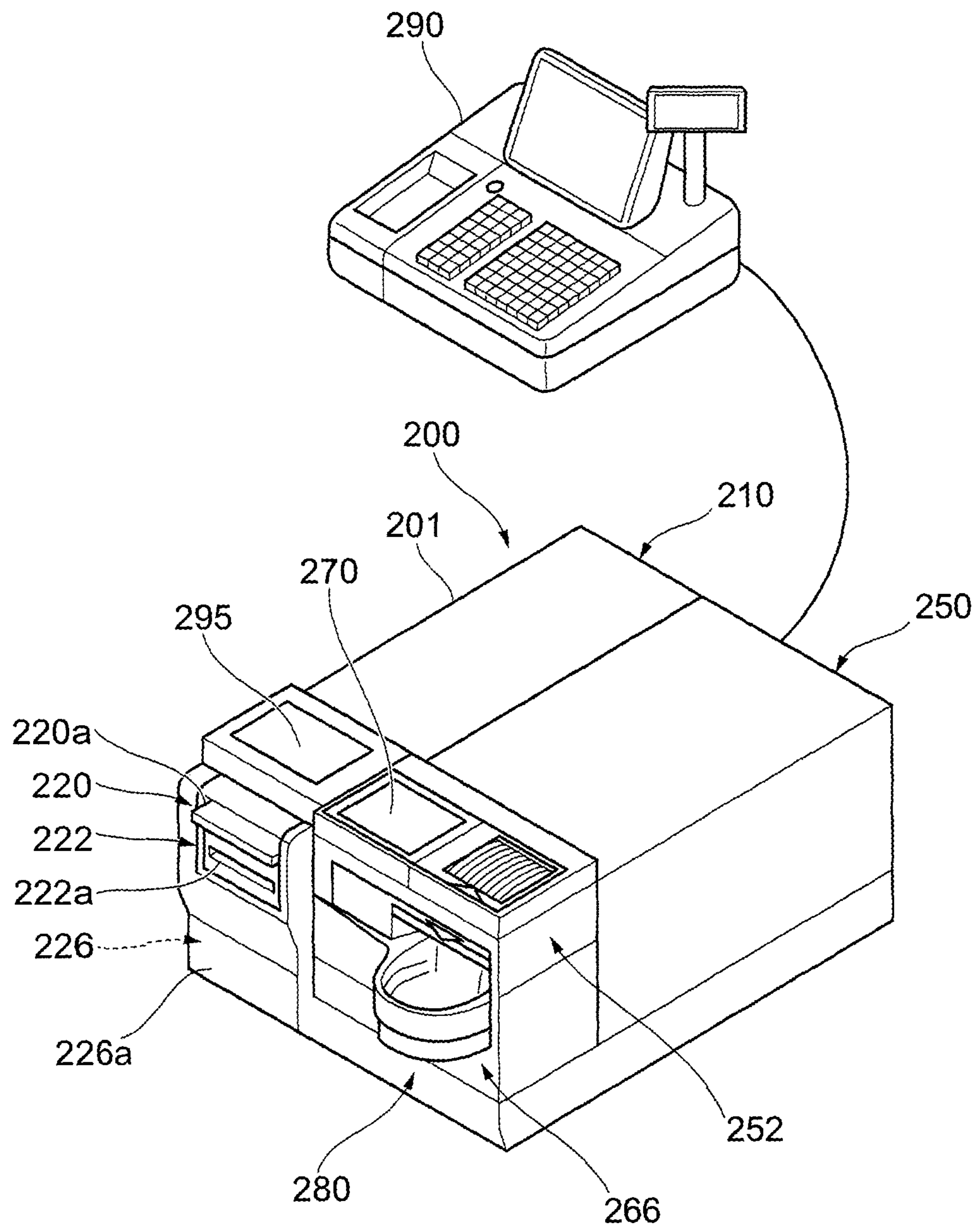
FIG. 7 shows example schematic configurations of a money change machine and a POS register.

FIG. 7 shows example schematic configurations of the money change machine 200 and the POS register 290.

Figure 8:
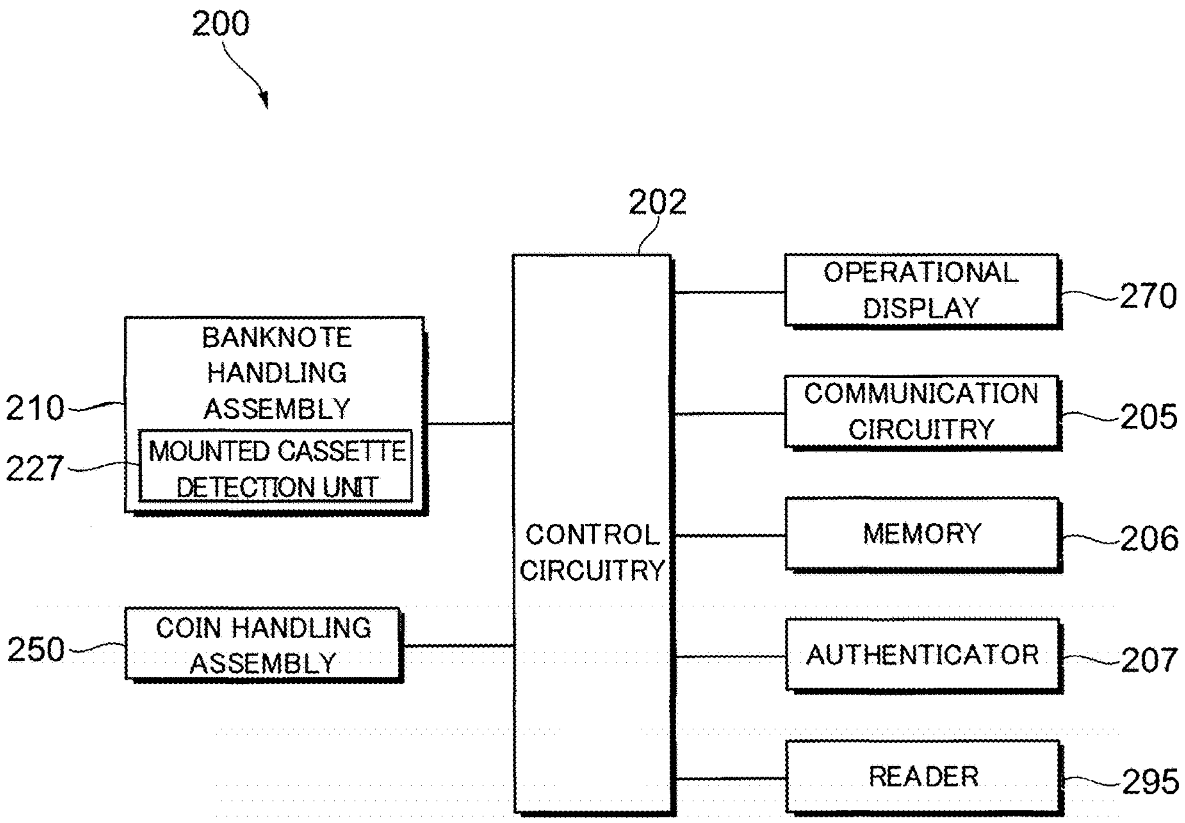
FIG. 8 shows an example block diagram of the money change machine.

FIG. 8 shows an example block diagram of the money change machine 200.

The money change machine 200 includes a banknote handling assembly 210, a coin handling assembly 250, and a coin-roll storage assembly 280. The money change machine 200 further includes an operational display 270, such as a touch panel, on the top front side of the coin handling assembly 250. The operational display 270 is configured to display an operational screen to be operated by the operator and information about the amount of money stored in each of the banknote handling assembly 210, the coin handling assembly 250, and the coin-roll storage assembly 280. On the operational display 270, the operator can input various commands to control circuitry 202 by touching the operation buttons on the operation screen with his/her finger. The money change machine 200 further includes a reader 295 for reading code information.

The banknote handling assembly 210 includes a banknote receiving unit 220, a banknote dispensing unit 222, a transporting unit, and a plurality of banknote storage units. The banknote handling assembly 210 further includes a cassette mounting unit 226 for detachable mounting of the storage cassette 300 (described below).

The transport unit includes a round transport unit and a plurality of connecting transport units. The round transport unit is provided with a recognition unit for recognizing a denomination, authenticity, fitness, face-up/face-down, a version, a transportation state, etc. of the banknotes transported by the round transport unit.

The front face of a housing 201 is provided with a banknote inlet 220*a* and a banknote outlet 222*a*. A cassette mounting unit 226 is provided on its front side with a door 226*a*, which is opened to allow the storage cassette 300 to be mounted on the cassette mounting unit 226 or to be removed from the cassette mounting unit 226. The cassette mounting unit 226 is provided with a mounted cassette detection unit 227, such as an optical sensor, for detecting mounting of the storage cassette 300 on the cassette mounting unit 226.

The coin handling assembly 250 includes a coin receiving unit 252, a coin dispensing unit 266, and a plurality of storage/feeding units that can store coins inside the housing 201 and feed the stored coins.

The money change machine 200 includes the control circuitry 202 inside the housing 201. The control circuitry 202 controls the banknote handling assembly 210, the coin handling assembly 250, etc. The control circuitry 202 may include a CPU, a ROM, and a RAM. The mounted cassette detection unit 227 is connected to the control circuitry 202, and information indicative of the detection of the storage cassette 300 by the mounted cassette detection unit 227 is transmitted to the control circuitry 202.

Also connected to the control circuitry 202 are the operational display 270, communication circuitry 205, a memory 206, an authenticator 207, and a reader 295.

The authenticator 207 is configured to authenticate the operator information (e.g., ID), authority, etc. of the operator operating the money change machine 200 and the POS register 290. Specifically, for example, in the case where the operator is required to enter his/her own operator information and PIN on the operational display 270, the authenticator 207 authenticates the operator information, authority, etc. of the operator based on the operator information and PIN of the operator entered on the operational display 270. As the authenticator 207, a card reader for reading an ID card or the like held by the operator may be provided to the money change machine 200 and the POS register 290. In this case, the authenticator 207 authenticates the operator information, authority, etc. of the operator based on the information read from the ID card or the like by the card reader.

For example, the reader 295 may be any known bar code reader that reads QR Codes® or bar codes as an example of the code information. For example, the reader 295 reads the code information displayed on the operational display 13 of the operator terminal 10. The control circuitry 202 obtains information such as an identifier of the operator terminal 10 included in the code information read by the reader 295.

While FIG. 7 illustrates the operational display 270 and the reader 295 as being distinct components, the operational display 270 and the reader 295 may be integrated into a single component. For example, the operational display 270 may have the function of reading the code information.

The POS register 290 is placed above the banknote handling assembly 210 and the coin handling assembly 250 and used as a management device to manage the money change machine 200. The POS register 290 may be a tablet terminal.

(Storage Cassette 300, Storage Case 400)

The storage cassette 300 (see FIG. 1) includes a generally cuboid casing 301, in which banknotes are stored in a stacked state. As described above, the storage cassette 300 is configured to be detachably mounted on the cassette mounting unit 126 of the money depositing/dispensing machine 100 and the cassette mounting unit 226 of the money change machine 200. An opening 302 is formed on a side of the casing 301 of the storage cassette 300. When the storage cassette 300 is mounted on the cassette mounting unit 126 of the money depositing/dispensing machine 100 or the cassette mounting unit 226 of the money change machine 200, banknotes are fed into the storage cassette 300 through the opening 302 from the transport unit 130 provided in the banknote handling assembly 110 of the money depositing/dispensing machine 100 or the transport unit provided in the banknote handling assembly 210 of the money change machine 200. Also, banknotes stored in the storage cassette 300 are fed out via the opening 302 to the transport unit 130 of the banknote handling assembly 110 of the money depositing/dispensing machine 100 or to the transport unit of the banknote handling assembly 210 of the money change machine 200.

In addition to the storage cassette 300, the system 1 of the present embodiment uses a storage case 400 (see FIG. 1) to transfer coins between the money depositing/dispensing machine 100 and each money change machine 200. For example, when collecting money from each money change machine 200, the operator transports the storage cassette 300 storing banknotes and the storage case 400 storing coins from the front area 91 to the back office area 92.

More specifically, when collecting money from the money change machine 200 installed in the front area 91 and depositing the collected money into the money depositing/dispensing machine 100 installed in the back office area 92, the operator mounts an empty storage cassette 300 on the cassette mounting unit 226 of the banknote handling assembly 210, thereby causing the banknotes stored inside the banknote handling assembly 210 to be stored into the storage cassette 300. Once the banknotes are stored in the storage cassette 300 mounted on the cassette mounting unit 226 in the banknote handling assembly 210, the control circuitry 202 transmits information about the stored banknotes, such as the number of banknotes for each denomination, to the server 30. The operator also causes the coin handling assembly 250 to dispense coins, and manually stores the dispensed coins into the storage case 400. Once the coins are dispensed from the coin handling assembly 250, the control circuitry 202 transmits information about the dispensed coins, such as the number of coins for each denomination, to the server 30.

The operator who has collected the money from the money change machine 200 then transports the storage cassette 300 and the storage case 400 together from the front area 91 to the back office area 92 to deposit the money into the money depositing/dispensing machine 100. Specifically, the operator mounts the storage cassette 300 on the cassette mounting unit 126 in the banknote handling assembly 110 of the money depositing/dispensing machine 100, thereby causing the banknotes stored in the storage cassette 300 to be stored into the banknote handling assembly 110. Once the banknotes are stored in the banknote handling assembly 110, the control circuitry 102 transmits information about the banknotes that had been stored in the storage cassette 300, such as the number of banknotes for each denomination, to the server 30. Also, the operator removes the coins from the storage case 400 and puts the removed coins into the coin receiving unit 152 in the coin handling assembly 150 of the money depositing/dispensing machine 100, thereby depositing the coins into the money depositing/dispensing machine 100. Once the coins are stored in the coin handling assembly 150, the control circuitry 102 transmits information about the coins that had been stored in the storage case 400, such as the number of coins for each denomination, to the server 30.

An example of the business support provided by the system 1 is described below with reference to a sequence chart.

Figure 9:
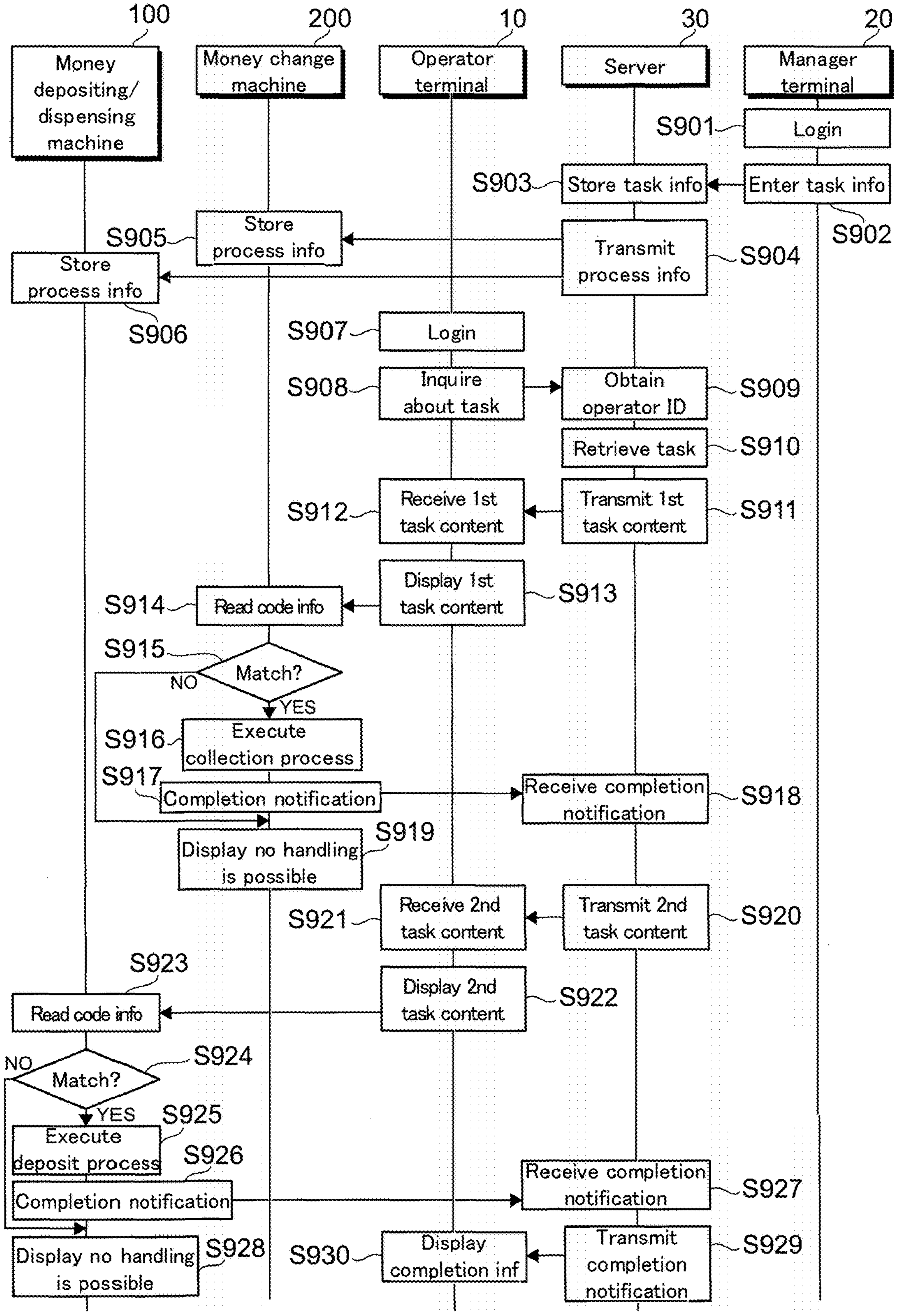
FIG. 9 is an example sequence chart for business support provided by the system.

FIG. 9 is an example sequence chart for business support provided by the system 1.

FIG. 9 is a sequence chart for a case in which an operator A collects all the money from the money change machine 200 and then deposits all the collected money into the money depositing/dispensing machine 100.

First, the manager logs into the manager terminal 20 to start the business support application (S901), and then enters task information including task content for the operator and an identifier of the operator terminal 10 (S902).

Upon the manager completing the entry, the task information is transmitted from the manager terminal 20 to the server 30 and stored in the memory 32 of the server 30 (S903). By way of example, FIG. 3 illustrates task information that is stored in the memory 32 in response to the manager entering information in step S902 specifying that the task content on Mar. 1, 2021 for the operator A is to collect money from a money change machine 200 and then to deposit the collected money into the money depositing/dispensing machine 100 and that the operator A is allowed to carry the operator terminal 10 of unit No. 1.

Then, the server 30 transmits process information to each target device stored in the memory 32, where the process information includes process content to be executed by the device corresponding to the task content stored in association with the device, as well as the identifier of the operator terminal 10 stored in association with the task content (S904). This transmission is done by the transmitting circuitry 312. For example, when the memory 32 stores the task content shown in FIG. 3, the transmitting circuitry 312 of the server 30 transmits, to the money change machine 200, the process information including a collection process and the identifier of the operator terminal 10 of unit No. 1, in order for the operator A carrying the operator terminal 10 of unit No. 1 to perform the task of collecting money from the money change machine 200. In the money change machine 200, the control circuitry 202 receives the process information via the communication circuitry 205 and stores it in the memory 206 (S905). Also, the transmitting circuitry 312 of the server 30 transmits, to the money depositing/dispensing machine 100, the process information including a deposit process and the identifier of the operator terminal 10 of unit No. 1, in order for the operator A carrying the operator terminal 10 of unit No. 1 to deposit money into the money depositing/dispensing machine 100. In the money depositing/dispensing machine 100, the control circuitry 102 receives the process information via the communication circuitry 105 and stores it in the memory 106 (S906).

For example, the processes from S901 to S906 may be performed by the time when the operator A starts his/her work for the day.

The operator logs into the operator terminal 10 to start the business support application (S907), and then inquires the server 30 about the task content (S908).

The server 30 receives the operator ID and the identifier of the operator terminal 10 transmitted from the operator terminal 10 (S909). If these received operator ID and identifier of the operator terminal 10 match the operator ID and the identifier of the operator terminal stored in the memory 32, the server 30 retrieves the task content for the operator stored in the memory 32 (S910). Then, the server 30 transmits, to the operator terminal 10, information about the content of the first task for the operator (S911). For example, the server 30 transmits, to the operator terminal 10 carried by operator A, information indicating that the first task for the operator A is to collect money from the first money change machine 200A. The server 30 may transmit information indicative of all processes for the operator A and the status of each process (e.g., processed, unprocessed, etc.) stored in the memory 32.

Upon receiving the information about the content of the first task transmitted from the server 30 (S912), the operator terminal 10 displays that task content on the operational display 13 and also displays code information (e.g., QR Code®) on the operational display 13 to be read by the target device on which to perform the task (S913). The task content and the code information to be read by the target device are caused to be displayed on the operational display 13 by the display control circuitry 114. The code information is generated by the generating circuitry 113.

Figure 10:
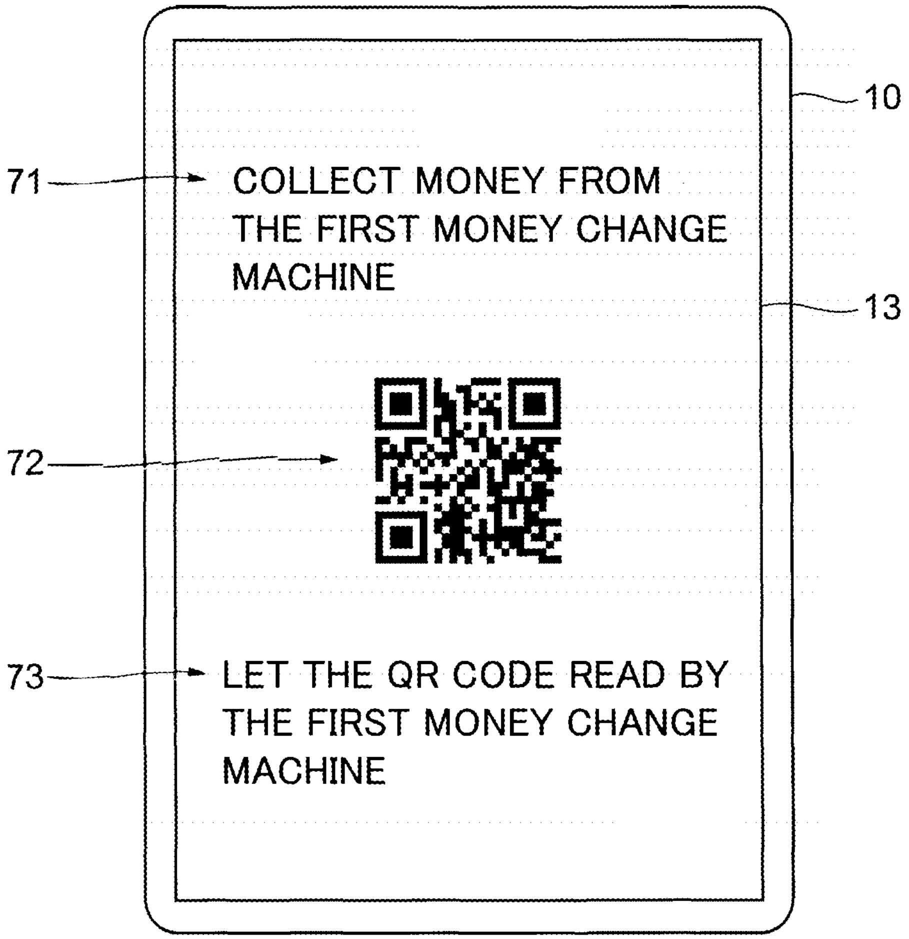
FIG. 10 shows example content displayed on a display of an operator's terminal.

FIG. 10 shows example content displayed on the operational display 13 of the operator terminal 10.

For example, in this sequence, the display control circuitry 114 causes the operational display 13 to present a text 71 "Collect money from the first money change machine" in order to prompt the operator to collect money from the first money change machine 200A, which is the task content. Additionally, the display control circuitry 114 causes the operational display 13 to display thereon code information 72 (QR Code® in FIG. 10) to be read by the reader 295 of the money change machine 200, and also causes the operational display 13 to present a text 73 "Let the QR code read by the first money change machine" in order to prompt the operator to let the code information 72, displayed on the operational display 13, read by the reader 295 of the first money change machine 200A.

The operator acts according to the instructions displayed on the operational display 13 of the operator terminal 10. In this sequence, the operator A goes to the location where the first money change machine 200A is installed and lets the reader 295 of the first money change machine 200A read the code information 72 displayed on the operational display 13. Thus, the reader 295 of the money change machine 200 reads the code information 72 displayed on the operational display 13 of the operator terminal 10 of the operator A (S914). The money change machine 200 then determines whether the information contained in the read code information 72 matches pre-stored information (S915). For example, the money change machine 200 determines whether there is any task stored in association with the identifier of the operator terminal 10 (S915). If there is such a task (YES in S915), the money change machine 200 executes the collection process that is stored in association with the identifier of the operator terminal 10 (S916). In this sequence, the money change machine 200 causes all banknotes stored therein to be stored into the storage cassette 300 mounted on the cassette mounting unit 226 of the banknote handling assembly 210, and also causes all coins to be dispensed from the coin handling assembly 250. Note that the determination in S915 does not necessarily require the identifier of the operator terminal 10, and any other information that can identify the task may be used. For example, the money change machine 200 may pre-store transaction serial numbers and determine whether the transaction serial number contained in the read code information 72 matches a pre-stored transaction serial number, and in response to a match being found, may execute a task that is stored in association with the matching transaction serial number.

Upon completion of the task, the money change machine 200 transmits a completion notification to the server 30 (S917). Thus, the server 30 receives the notification that the collection process at the money change machine 200 has been completed (S918).

When the storage cassette 300 is not mounted on the cassette mounting unit 226 of the banknote handling assembly 210, the money change machine 200 may display, on the operational display 270, a prompt prompting the operator to mount the storage cassette 300 on the cassette mounting unit 226.

Upon causing the coin handling assembly 250 to dispense coins, the money change machine 200 may also display, on the operational display 270, a prompt prompting the operator to manually collect the dispensed coins from the coin dispensing unit 266 and store them in the storage case 400.

When the operator terminal 10 displays the task content on the operational display 13 in S913, it may also display texts explaining specific operations. For example, in this sequence, a text prompting the operator to mount the storage cassette 300 on the cassette mounting unit 226 of the banknote handling assembly 210 and a text prompting the operator to manually collect the coins dispensed on the coin dispensing unit 266 and store them in the storage case 400 may be displayed on the operational display 13.

On the other hand, if it is determined in S915 that there is no task stored in association with the identifier of the operator terminal 10 (NO in S915), the money change machine 200 displays, on the operational display 270, a notification that no handling is possible (S919). Alternatively, the money change machine 200 may transmit, via the server 30, a notification to the operator terminal 10 that no handling is possible.

Upon receiving the completion notification from the money change machine 200 (S918), the server 30 transmits, to the operator terminal 10, information about the content of the second task for the operator (S920). For example, the server 30 transmits, to the operator terminal 10 carried by the operator A, information indicating that the second task for the operator A is to deposit the money collected from the first money change machine 200A into the money depositing/dispensing machine 100. Note that instead of transmitting information about content of a next task each time a preceding task has been completed, like transmitting information about the content of the second task following receipt of the notification that the first task has been completed, information about content of all tasks may be transmitted first, and a process may not be executed if it is found, upon reading the code information by the relevant device, that a preceding task has not been completed.

Upon receiving the information about the content of the second task transmitted from the server 30 (S921), the operator terminal 10 displays that task content on the operational display 13 and also displays code information 82 (see FIG. 11) on the operational display 13 to be read by the target device on which to perform the task (S922).

Figure 11:
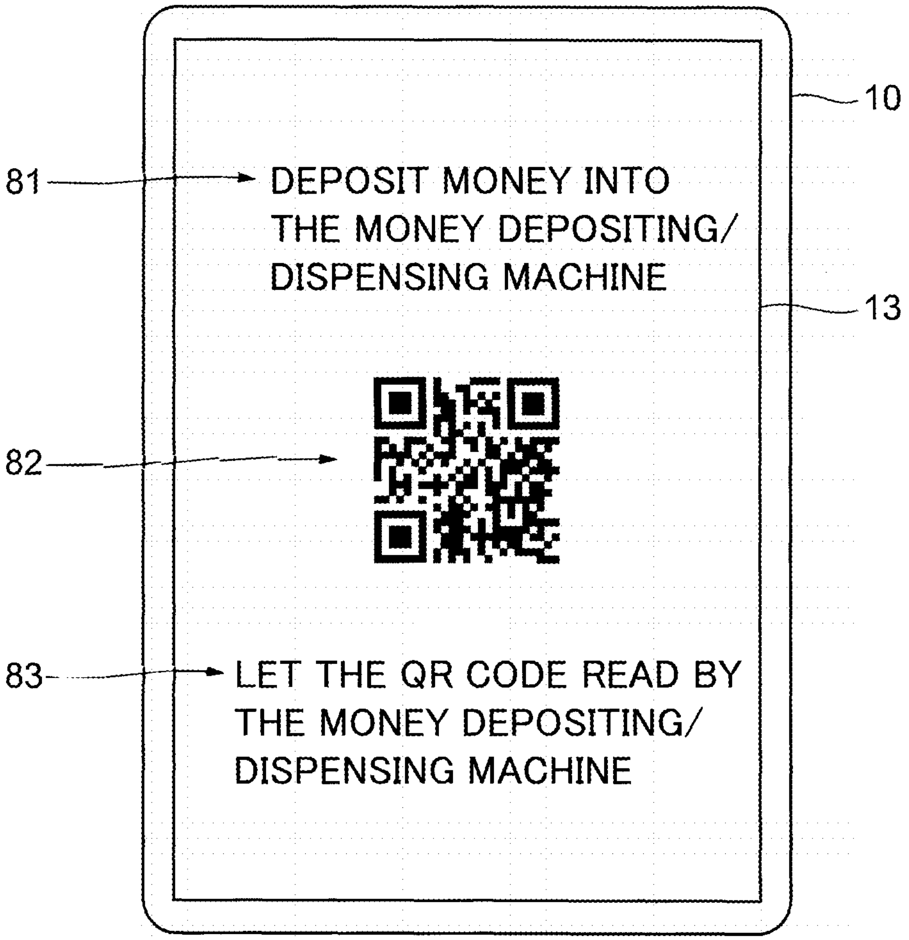
FIG. 11 shows example content displayed on the display of the operator's terminal.

FIG. 11 shows example content displayed on the operational display 13 of the operator terminal 10.

For example, in this sequence, the display control circuitry 114 causes the operational display 13 to present a text 81 "Deposit money into the money depositing/dispensing machine" in order to prompt the operator to deposit money into the money depositing/dispensing machine 100. In addition, the display control circuitry 114 causes the operational display 13 to display thereon code information 82 (QR Code® in FIG. 11) to be read by the reader 195 of the money depositing/dispensing machine 100, and also causes the operational display 13 to present a text 83 "Let the QR code read by the money depositing/dispensing machine" in order to prompt the operator to let the code information 82, displayed on the operational display 13, read by the reader 195 of the money depositing/dispensing machine 100.

The operator acts according to the instructions displayed on the operational display 13 of the operator terminal 10. In this sequence, the operator A goes to the location where the money depositing/dispensing machine 100 is installed and lets the reader 195 of the money depositing/dispensing machine 100 read the code information 82 displayed on the operational display 13. Thus, the reader 195 of the money depositing/dispensing machine 100 reads the code information 82 displayed on the operational display 13 of the operator terminal 10 of the operator A (S923).

The money depositing/dispensing machine 100 then determines whether the information contained in the read code information 82 matches pre-stored information (S924). Specifically, the money depositing/dispensing machine 100 determines whether there is any task stored in association with the identifier of the operator terminal 10 (S924). If there is such a task (YES in S924), the money depositing/dispensing machine 100 executes the process that is pre-stored in association with the identifier of the operator terminal 10 (S925). In this sequence, the money depositing/dispensing machine 100 causes banknotes stored in the storage cassette 300 mounted on the cassette mounting unit 126 of the banknote handling assembly 110 to be stored into the banknote handling assembly 110 and also causes coins fed into the coin receiving unit 152 to be stored into the coin handling assembly 150.

Upon completion of the process, the money depositing/dispensing machine 100 transmits a completion notification to the server 30 (S926). Thus, the server 30 receives the notification that the depositing task at the money depositing/dispensing machine 100 has been completed (S927).

When the storage cassette 300 is not mounted on the cassette mounting unit 126 of the banknote handling assembly 110, the money depositing/dispensing machine 100 may display, on the operational display 104, a prompt prompting the operator to mount the storage cassette 300 on the cassette mounting unit 126.

Also, when no coins have been fed into the coin receiving unit 152, the money depositing/dispensing machine 100 may display, on the operational display 104, a prompt prompting the operator to feed coins into the coin receiving unit 152.

When the operator terminal 10 displays the task content on the operational display 13 in S922, it may also display texts explaining specific operations. For example, in this sequence, a text prompting the operator to mount the storage cassette 300 on the cassette mounting unit 126 of the banknote handling assembly 110 and a text prompting the operator to feed coins into the coin receiving unit 152 may be displayed on the operational display 13.

On the other hand, if it is determined in S924 that there is no task stored in association with the identifier of the operator terminal 10 (NO in S924), the money depositing/dispensing machine 100 displays, on the operational display 104, a notification that no handling is possible (S928). Alternatively, the money depositing/dispensing machine 100 may transmit, via the server 30, a notification to the operator terminal 10 that no handling is possible.

Upon receiving the completion notification from the money depositing/dispensing machine 100 (S927), the server 30 transmits, to the operator terminal 10, a notification that the task has been completed (S929). Upon receiving this notification that the task has been completed, the operator terminal 10 displays task completion information on the operational display 13 (S930).

In the above embodiment, the money depositing/dispensing machine 100 and the money change machine 200 each include a cassette mounting unit (e.g., the cassette mounting unit 126), and banknotes are collected and deposited via the storage cassette 300. However, this embodiment is not limiting. For example, an operator may manually collect and deposit banknotes.

The sequence described with reference to FIG. 9 illustrates an all-collection scenario, in which coins and banknotes of all denominations are collected in collecting the money. However, such an all-collection scenario is not limiting. For example, other scenarios are possible as well, including an all coins-collection scenario, in which only coins of all denominations are collected, an all banknotes-collection scenario, in which only banknotes of all denominations are collected, an individual collection scenario, in which coins/banknotes of only a specified denomination(s) are collected, an intermediate collection scenario, in which a set number of coins/banknotes is collected, and a partial collection scenario, in which coins/banknotes are collected such that a set number/amount of coins/banknotes is left in the money change machine 200. The same applies to how the money is deposited; all the collected money may be deposited, coins/banknotes of only a specified denomination (s) may be deposited, or the money may be deposited with a set number/amount of coins/banknotes left.

The sequence described with reference to FIG. 9 is an example of tasking an operator with routine operations that need to be performed on a daily basis. Additionally, the system 1 may be used to present to an operator non-routine operations, such as those that need to be performed due to an error occurring in a device, for example.

A sequence to follow when using the system 1 to task an operator with non-routine operations is described below.

Figure 12:
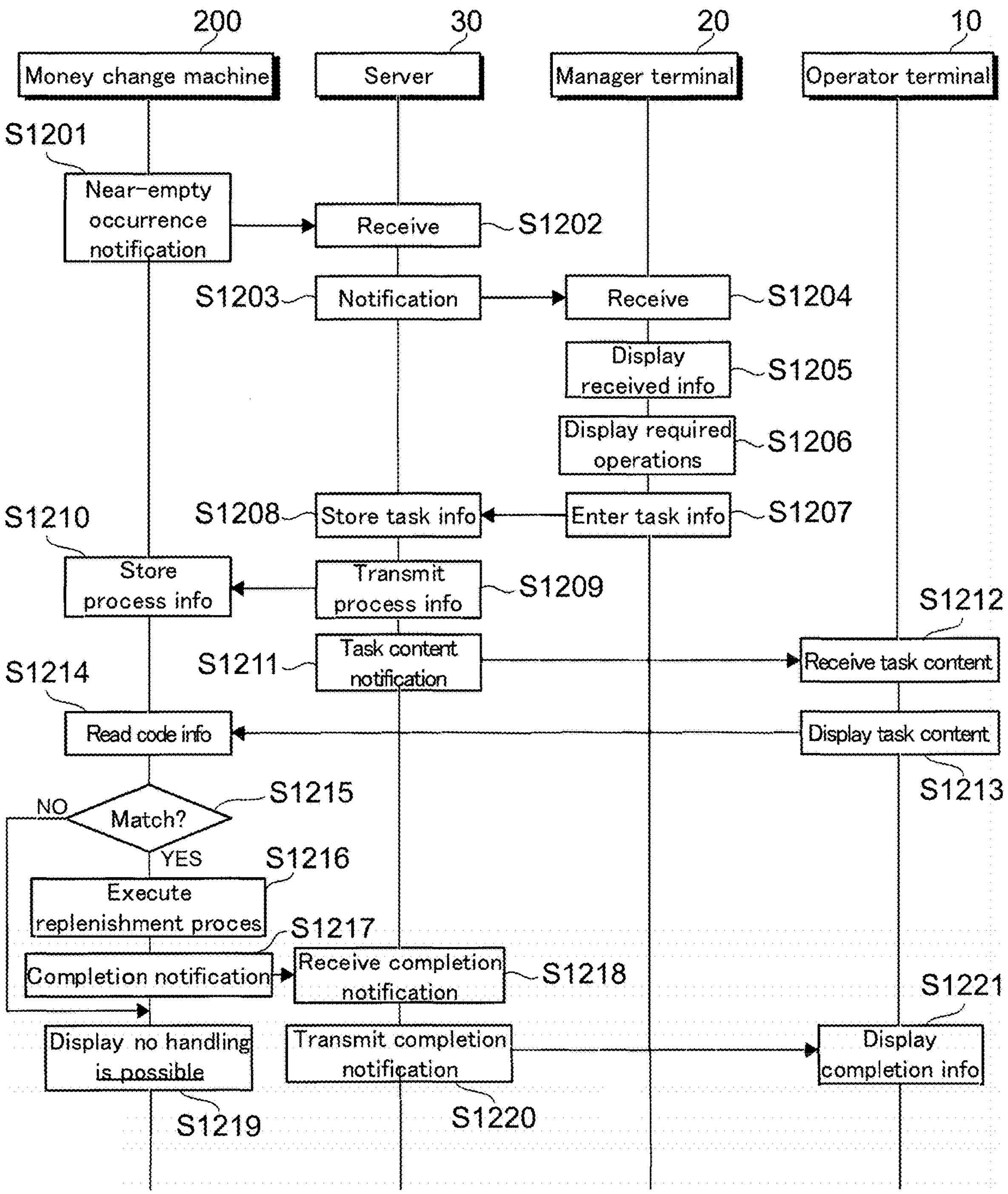
FIG. 12 is an example sequence chart for business support for non-routine business operations provided by the system.

FIG. 12 is an example sequence chart for business support for non-routine operations provided by the system 1.

In response to a predetermined event occurring in a device, the device notifies the server 30 of the occurrence of the event. Predetermined events are registered for each device; for example, in the case of the money change machine 200, the predetermined events may include a near-empty state and a near-full state. FIG. 12 shows a sequence chart when a near-empty state occurs in the money change machine 200.

In response to detecting its near-empty state, the money change machine 200 notifies the server 30 of the near-empty state (S1201). At that time, the money change machine 200 also notifies the server 30 of which denomination of the banknotes or coins are near-empty.

Upon receiving from the money change machine 200 the notification that it is near-empty (S1202), the server 30 transmits a push notification to the manager terminal 20, informing it of the near-empty state of the money change machine 200 (S1203).

Upon receiving the notification from the server 30 (S1204), the manager terminal 20 starts the business support application and displays the received information on the display 23 (S1205). In response to the manager selecting information displayed on the display 23, the manager terminal 20 displays necessary operations (S1206). The manager enters task information, including task content for an operator and an identifier of the operator terminal (S1207). This is similar to the process in S902. In this sequence, for example, the manager enters the task information specifying that the task for the operator A is to replenish the money change machine 200 with money and that the operator A is allowed to carry the operator terminal 10 of unit No. 1.

Upon the manager completing the entry of the task information, the entered information is transmitted from the manager terminal 20 to the server 30 and stored in the memory 32 of the server 30 (S1208). This is similar to the process in S903.

Then, the server 30 transmits process information to the target device stored in the memory 32, where the process information includes process content to be executed by the device corresponding to the task content stored in association with the device, as well as the identifier of the operator terminal 10 stored in association with the task content (S1209). This is similar to the process in S904. In this sequence, the transmitting circuitry 312 of the server transmits, to the money change machine 200, the process information including a replenishment process and the identifier of the operator terminal 10 of unit No. 1, in order for the operator A carrying the operator terminal 10 of unit No. 1 to perform the task of replenishing the money change machine 200 with money. In the money change machine 200, the control circuitry 202 receives the process information via the communication circuitry 205 and stores it in the memory 206 (S1210).

The server 30 also transmits a push notification to the operator terminal 10 carried by the operator registered in S1207, informing the operator of the task content for the operator (S1211).

Upon receiving the notification from the server 30 (S1212), the operator terminal 10 starts the business support application and displays the received information on the operational display 13 (S1213). This process is similar to the process in S922, for example. However, the specific content displayed on the operational display 13 differs from that illustrated in FIG. 11; instead of the text 81, a text "Replenish the money change machine with money" is displayed, and instead of the code information 82, code information corresponding to replenishment of money in the money change machine 200 is displayed.

The operator acts according to the instructions displayed on the operational display 13 of the operator terminal 10. In this sequence, the operator A goes to the location where the money change machine 200 is installed, lets the reader 295 of the money change machine 200 read the code information displayed on the operational display 13, and performs a required task to resolve the near-empty state. For example, the operator A feeds banknotes into the banknote inlet 220*a* or feeds coins into the coin receiving unit 252. Thus, the reader 295 of the money change machine 200 reads the code information displayed on the operational display 13 of the operator terminal 10 of the operator A (S1214). This is similar to the process in S923.

The money change machine 200 then determines whether the information contained in the read code information matches pre-stored information (S1215). Specifically, the money change machine 200 determines whether there is any task stored in association with the identifier of the operator terminal 10 (S1215). This is similar to the process in S924. If there is such a task (YES in S1215), the money change machine 200 executes the process that is pre-stored in association with the identifier of the operator terminal 10 (S1216). In this sequence, the money change machine 200 executes a replenishment process of storing the banknotes fed into the banknote inlet 220*a* or the coins fed into the coin receiving unit 252 (S1216).

Upon completion of the process, the money change machine 200 transmits a completion notification to the server 30 (S1217). Thus, the server 30 receives the notification that the task at the money change machine 200 has been completed (S1218). The processes in S1217 and S1218 are similar to the processes in S926 and S927, respectively.

On the other hand, if it is determined in S1215 that there is no task stored in association with the identifier of the operator terminal 10 (NO in S1215), the money change machine 200 displays, on the operational display 207, a notification that no handling is possible (S1219). Alternatively, the money change machine 200 may transmit, via the server 30, a notification to the operator terminal 10 that no handling is possible. The process in S1219 is similar to the process in S928.

Upon receiving the completion notification from the money change machine 200 (S1218), the server 30 transmits, to the operator terminal 10, a notification that the task has been completed (S1220). The operator terminal 10 receives this notification that the task has been completed, and displays task completion information on the operational display 13 (S1221). The processes in S1220 and S1221 are similar to the processes in S929 and S930, respectively.

As described above, a push notification is sent in response to an error occurring in a device. However, if the error has already been resolved at the time of initiating a relevant task, e.g., if a near-empty state that had occurred in the money change machine 200 has already been resolved by a customer's feeding of money, the task may be automatically removed from the task list for the device.

As described above, the system 1 includes the operator terminal 10 carried by the operator and the server 30 that can communicate with the operator terminal 10. The server 30 includes the receiving circuitry 311 as an example of the acceptor for accepting task information including content of a task to be performed by the operator on a device (e.g., the money change machine 200) and an identifier of the operator terminal 10, and the transmitting circuitry 312 as an example of the transmitter for transmitting the task information to the operator terminal 10. The operator terminal 10 includes the receiving circuitry 111 as an example of the receiver for receiving the task information, and the operational display 13 as an example of the display for displaying the task content to be performed on the device, based on the task information received by the receiving circuitry 111.

The system 1 allows the task content to be displayed on the operational display 13 of the operator terminal 10 carried by the operator. As such, the system 1 can teach the task content to the operator. Since the operator can perform the task as he/she views the task content displayed on the operational display 13 of the operator terminal 10, there is no need for the operator to learn various operations on a wide variety of devices. In addition, when multiple tasks are expected to be performed on the day, the operator does not need to memorize the order of the multiple tasks because he/she needs to only perform the displayed tasks in response to each task being displayed on the operational display 13 of the operator terminal 10. This can reduce the occurrence of operational errors. In addition, the manager does not need to teach all the various operations on a wide variety of devices even when, for example, operators are frequently replaced or the number of operators is rapidly increased. As such, the use of the system 1 can reduce training costs.

Here, the receiving circuitry 311 of the server 30 receives information transmitted from the manager terminal 20 that has been registered in advance. In other words, the receiving circuitry 311 accepts input from a predetermined manager. More specifically, the receiving circuitry 311 of the server 30 accepts the input from the manager by receiving task content for an operator and information about the operator terminal 10, which are entered by the manager upon starting the business support application installed on the manager terminal 20. Thus, the system 1 can assign to the operator a task(s) set by the manager, which can reduce the burden on the manager such as that associated with operator training. Note that the manager is not restricted to using the predetermined manager terminal 20 to enter the information. The manager may enter the information via any terminal on which the business support application is installed.

The operator terminal 10 further includes the output (e.g., the operational display 13) for outputting a task signal, including an identifier, based on the task information received by the receiving circuitry 111. The device (e.g., the money change machine 200) includes the reader (e.g., the reader 295) for reading the output task signal from the output (e.g., the operational display 13) and the obtainer (e.g., the control circuitry 202) for obtaining process information, including an identifier and process content, transmitted from the server 30. The device (e.g., the money change machine 200) executes the process (e.g., dispensing process) included in the process information when there is a match between the identifier of the operator terminal 10 included in the task signal read by the reader (e.g., the reader 295) and the identifier included in the process information obtained by the obtainer (e.g., the control circuitry 202). Thus, the device (e.g., the money change machine 200) executes the process (e.g., dispensing process) registered in association with the operator terminal 10 only when it reads the task signal output from the operator terminal 10 that the manager has registered in advance. This can cause the operator to perform the predetermined task(s) with a high degree of certainty.

For example, the task signal may be in the form of a QR Code® (e.g., QR Code® 72) or bar code. The task signal may be an RFID signal.

The device (e.g., money change machine 200) also transmits process execution results to the server 30. Thus, the system 1 allows the manager to sequentially check the task history by viewing the task history stored in the server 30. This allows the manager to know the progress of each task, so that the manager can monitor the operators' task performance even remotely and prevent the operators from forgetting to do their tasks. The manager can also set a time, e.g., an end time, by which a task should be completed, and if the task has not been completed by the end time, the server 30 may notify the operator and/or the manager that the end time has been passed. Note that the server to which the device transmits process execution results and the server that accepts input from the manager may each be different servers.

The receiving circuitry 311 of the server 30 accepts input regarding content of multiple tasks. For example, in the sequence described with reference to FIG. 9, the receiving circuitry 311 accepts the tasks of collecting money from the money change machine 200 and depositing the collected money into the money depositing/dispensing machine 100. The multiple tasks may be tasks on a single device. For example, the multiple tasks may be to deposit money into the money depositing/dispensing machine 100 and to clean the mounted cassette detection unit 127 of the money depositing/dispensing machine 100.

The receiving circuitry 311 of the server 30 also accepts input regarding the order in which the multiple tasks should be performed. For example, in the sequence described with reference to FIG. 9, the receiving circuitry 311 accepts the first task of collecting money from the money change machine 200 and the second task of depositing the collected money into the money depositing/dispensing machine 100. This eliminates the need for the operator to memorize the order of multiple tasks. This will consequently reduce the occurrence of operational errors.

As described above, the business support method using the system 1 includes step S903 as an example of the step of accepting task content to be performed by an operator on a device (e.g., the money change machine 200) and an identifier of an operator terminal 10 carried by the operator. The business support method further includes step S911 as an example of the step of transmitting task information including the task content to the operator terminal 10, and step S913 as an example of the step in which the operator terminal 10 displays the task content to be performed on the device based on the received task information.

The business support method further includes step S913 as an example of the step in which the operator terminal 10 outputs a task signal (e.g., QR Code® 72) including an identifier based on the received task information, and S914 as an example of the step in which the device (e.g., the money change machine 200) reads the task signal. The business support method further includes step S905 as an example of the step in which the device obtains process information including process content, and step S916 as an example of the step in which the device executes a process included in the process information when there is a match between the identifier included in the task signal and the identifier included in the process information.

In the illustration of the system 1 according to the above embodiment, the money depositing/dispensing machine 100 and the money change machines 200 are provided in the store 90, and the operator performs tasks on these money depositing/dispensing machine 100 and money change machines 200. However, this embodiment is not limiting. For example, a door with an electromagnetic locking mechanism and a reader for reading code information may be provided at the boundary between the front area 91 and the back office area 92 of the store 90. And the operator terminal 10 may be capable of displaying, upon receiving information from the server 30, code information to open the door, and the door may unlock the electromagnetic locking mechanism in response to the reader reading predetermined code information. Further, the door may have a function to transmit to the server 30 the time of unlocking and the identifier of the operator terminal 10 that displayed the code information.

For example, in the context of operations of the operator A described with reference to the sequence chart of FIG. 9, the server 30 may transmit to the operator terminal 10 information for displaying code information to open the door, after receiving the completion notification from the money change machine 200 (S918) and before transmitting to the operator terminal 10 information about the second task content for the operator A (S920). In this way, only the operator who is carrying the operator terminal 10 that has received information from the server 30, and thus who has been authorized by the manager, may be allowed to move from the front area 91 to the back office area 92, and the server 30 may be enabled to obtain a history of the opening/closing of the door. This provides increased security.

Similarly, a locker or safe may be provided in the back office area 92, and the locker or safe may be unlocked by letting it read the code information that is displayed on the operator terminal 10 in response to the terminal 10 receiving information from the server 30. Also, the server 30 may be enabled to obtain a history of unlocking.

Still similarly, a key management machine with a reader for reading code information may be provided in the back office area 92, and an operator may be authorized to remove a key from the key management machine by letting the key management machine read the code information that is displayed on the operator terminal 10 in response to the terminal 10 receiving information from the server 30. And the server 30 may be enabled to obtain a history of unlocking. For example, in order to use a manager key while a manager, such as a store manager, is absent, an employee may be authorized to remove the manager key for limited hours, e.g., from 9:00 to 15:00. Also, when a key for a cassette, such as the storage cassette 300, is required to collect money from the money change machine 200, a command "collect money from the money change machine" and a command "remove the cassette key from the key management machine" may be registered as a command group corresponding to the workflow of the collection task.

Alternatively, ticketing and charge machines may be provided in the front area 91 of the store 90, and a task directed by the server 30 may be to collect money from these ticketing and charge machines.

In the system 1 described above, the server 30 transmits to a device the process information corresponding to the task content stored in association with the device (S904). However, this embodiment is not limiting. For example, when a device reads the code information displayed on the operational display 13 of an operator terminal 10, the device may inquire the server 30 about a process corresponding to the task content stored in association with the operator terminal 10.

The code information to be displayed on the operational display 13 of the operator terminal 10 is generated by the generating circuitry 113 of the operator terminal 10 based on the information transmitted from the server 30. However, this embodiment is not limiting. The control circuitry 31 of the server 30 may generate the code information and transmit the generated code information to the operator terminal 10.

When there are multiple tasks on a single device, the code information displayed on the operational display 13 of the operator terminal 10 to be read by the device may include information about content of the multiple tasks. The device that reads the code information may display guidance for the multiple tasks on the operational display (e.g., the operational display 104) so that the operator can continue to perform the multiple tasks in accordance with the guidance. Alternatively, the server 30 may transmit information about content of the multiple tasks to the operator terminal 10 at one time, and the operator terminal 10 may display the content of the multiple tasks on the operational display 13. However, even when there are multiple tasks on a single device, the server 30 may transmit to the operator terminal information about content of the first task on the device and then, upon receiving a notification that the first task has been completed, transmit to the operator terminal 10 information about content of the second task on the device, as described with reference to FIG. 9.

A device may authenticate an operator with its own authenticator (e.g., the authenticator 107 or 207) before reading the code information with a reader (e.g., the reader 195 or 295). This provides increased security. Further, the device may execute a process when there is a match between an operator authenticated by the authenticator (e.g., the authenticator 107 or 207) and an operator identified by reading the code information with the reader (e.g., the reader 195 or 295). This provides even greater security.

For example, the output (e.g., the operational display 13) outputs a task signal including an ID as an example of the operator information for identifying an operator, and the obtainer (e.g., the control circuitry 202) obtains an ID as an example of the operator information in advance as part of the process information. Then, the device (e.g., the money change machine 200) executes a process when there is a match between the operator information obtained by the obtainer (e.g., the control circuitry 202) and the operator information included in the task signal read by the reader (e.g., the reader 295). This makes it possible to have a predetermined operator perform a predetermined task. In other words, it is possible to prevent any unintended person from performing a task on the device (e.g., the money change machine 200). This provides improved security.

Also, the device may limit the number of times in which a process can be performed using a single instance of code information displayed on the operational display 13 of the operator terminal 10. For example, the number of times may be limited to one, two, or three. In the case of limiting the number of times to one, in the sequence chart of FIG. 9, for example, the money change machine 200 executes the collection process upon the reader 295 reading the code information displayed on the operational display 13 of the operator terminal for the first time in S914, but after that, the money change machine 200 will never execute the collection process even when the reader 295 reads the same code information again. This can prevent the device from executing a process that is not intended by the manager who registered the task content.

When the server 30 transmits information about the task content to the operator terminal 10 (e.g., in S911), information about the location of a target device for the task may be included in that information, and when the operator terminal 10 displays the task content on the operational display 13 (in S913), the operator terminal 10 may display, e.g., a floor map to show the location of the target device. When displaying a floor map, an icon may be added to the target device to indicate the destination, and/or a route from the current location to the target device may be shown. This allows for easier identification of the target device even when multiple identical devices are installed, like, e.g., the multiple money change machines 200 installed in the front area 91. In addition, when the device includes a lamp, speaker, or any other notification device, and a predetermined task is registered to be performed at a predetermined timing (e.g., arrival of a predetermined time of day or occurrence of a predetermined event), the device may, at the predetermined timing, light or flash the lamp or generate sound from the speaker to guide the operator.

When the operator has mistakenly let a reader of a different device read the code information displayed on the operational display 13 of the operator terminal 10, the device may display an indication on e.g., its own operational display that the device is not the right one on which to perform a task. For example, in the context of operations of the operator A described with reference to the sequence chart of FIG. 9, when the operator A has let a reader 295 of a different money change machine 200 than the first money change machine 200A, e.g., a second money change machine 200B, read the code information displayed on the operational display 13 of the operator terminal 10, the second money change machine 200B may display an indication on e.g., its operational display 270 that this device is not the right one. Furthermore, the second money change machine 200B may display, on its operational display 270, the name of the true target device (the first money change machine 200A) as well as the location of the true target device.

The code information may be displayed on the operational display of a relevant device (e.g., on the operational display 104 or 270) rather than on the operator terminal 10. In such a case, the device may generate the code information, or the server 30 may generate and transmit the code information to the device. In such a configuration, the device need not be equipped with a reader (e.g., the reader 195 or 295) for reading the code information. When the code information is displayed on the operational display of the device, the operator can easily understand that the device displaying the code information is the one on which to perform the task. For example, when an operator is registered to perform a predetermined task at a predetermined time of day, displaying the code information on the target device for the task at the predetermined time of day allows the operator to easily understand that this device is the target device waiting for performance of the task.

When the code information is displayed on the operational display of the device, information indicating that an operator has read the code information using an operator terminal 10 may be transmitted to the server 30, and the server 30 may notify the device that the terminal that has read the code information is a registered operator terminal 10 and therefore the process may be executed. Also, after the information indicating that the code information displayed on the device has been read by an operator terminal 10 is transmitted to the server 30, the server 30 may require authentication of the operator. For example, the server 30 may issue a notification prompting entry of a PIN to the operator terminal 10. This provides improved security.

In the system 1 described above, the SIM card may be removed from the operator terminal 10 to restrict its use to within the store 90. This can inhibit operators from making off-duty calls while on duty and have them concentrate on their work.

The GPS function of the operator terminal 10 may also be enabled. This facilitates locating the operator terminal 10 even if an operator were to lose it, for example. This also allows for tracking of an operator's whereabouts even if he/she goes outside the store 90, for example.

The system 1 described above is a system that supports operations of operators engaged in tasks at the store 90 in a commercial facility. However, this embodiment is not limiting. For example, the system 1 may be a system that supports operations to collect sales proceeds by a security company or operations of operators engaged in change fund delivery services. Alternatively, the system 1 may be a system that supports operations of operators engaged in money dispensing/depositing services at financial institutions. Still alternatively, the system 1 may be a system that supports operations of operators engaged in cash withdrawal services for the elderly or disabled.

The following is a detailed description of a system that supports operations to collect sales proceeds by a security company.

Second Embodiment

Figure 13:
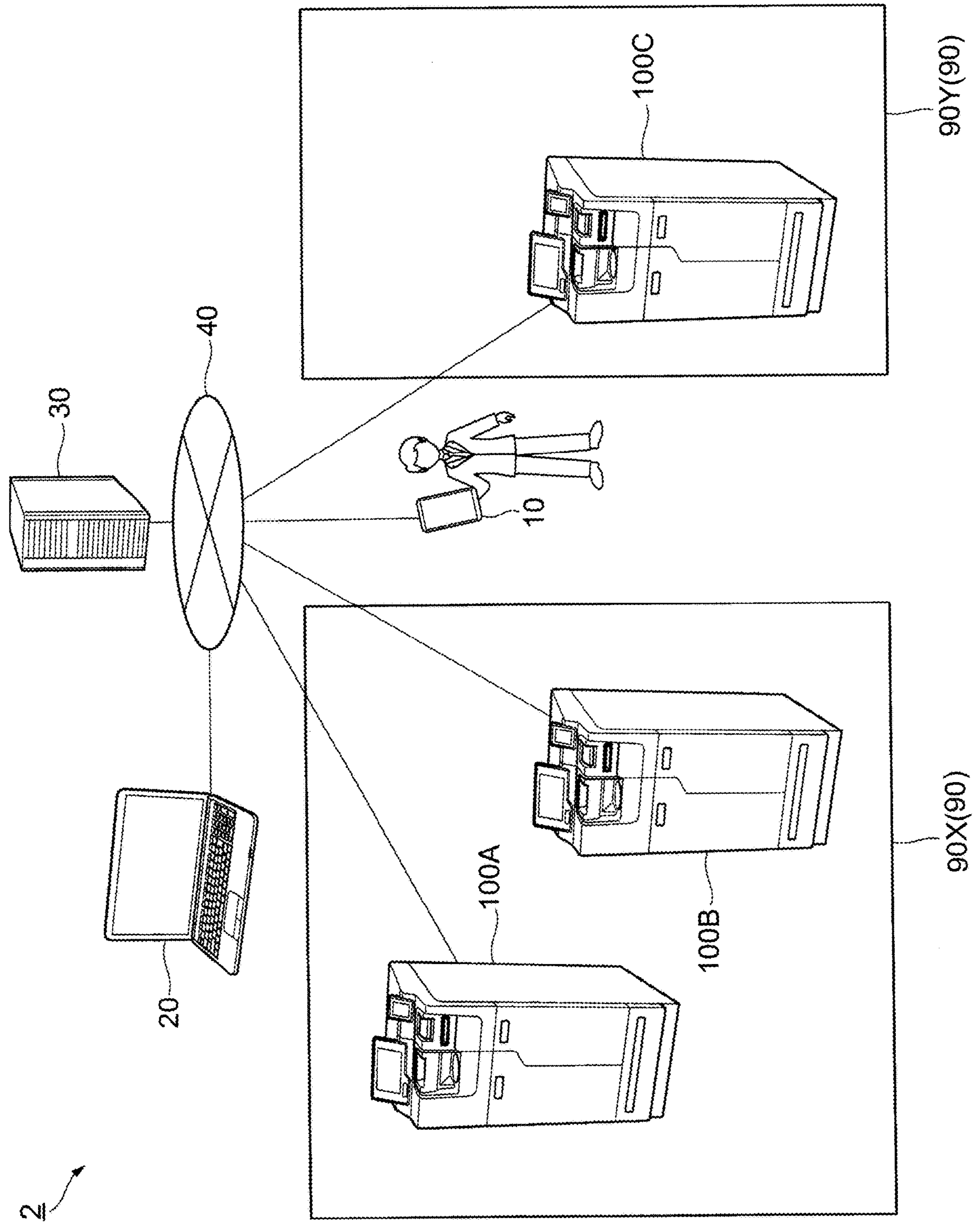
FIG. 13 shows an example schematic configuration of a business support system according to a second embodiment.

FIG. 13 shows an example schematic configuration of a business support system 2 (which may be simply referred to hereinafter as a "system 2") according to a second embodiment.

The system 2 according to the second embodiment is a system that supports operations of an employee of a security company, or an operator, to collect sales proceeds from a money depositing/dispensing machines 100 installed in, e.g., a store 90 in a commercial facility. The distinctions of the system 2 according to the second embodiment over the system 1 according to the first embodiment are described below. Like reference numerals will be used to denote like elements between the first and second embodiments, and a detailed description thereof will be omitted.

The system 2 includes an operator terminal 10 carried and used by an employee, or an operator, of a security company, a manager terminal 20 used by a manager who manages the operators, and a server 30 that supports operations of the operators. The system 2 further includes money depositing/dispensing machines 100 installed in a store(s) 90 in a commercial facility. By way of example, FIG. 13 shows two money depositing/dispensing machines 100 installed in a store X 90X, namely a first money depositing/dispensing machine 100A and a second money depositing/dispensing machine 100B, and a sole money depositing/dispensing machine 100 installed in a store Y 90Y, namely a money depositing/dispensing machine 100C.

An example of business support provided by the system 2 is described below with reference to a sequence chart.

Figure 14:
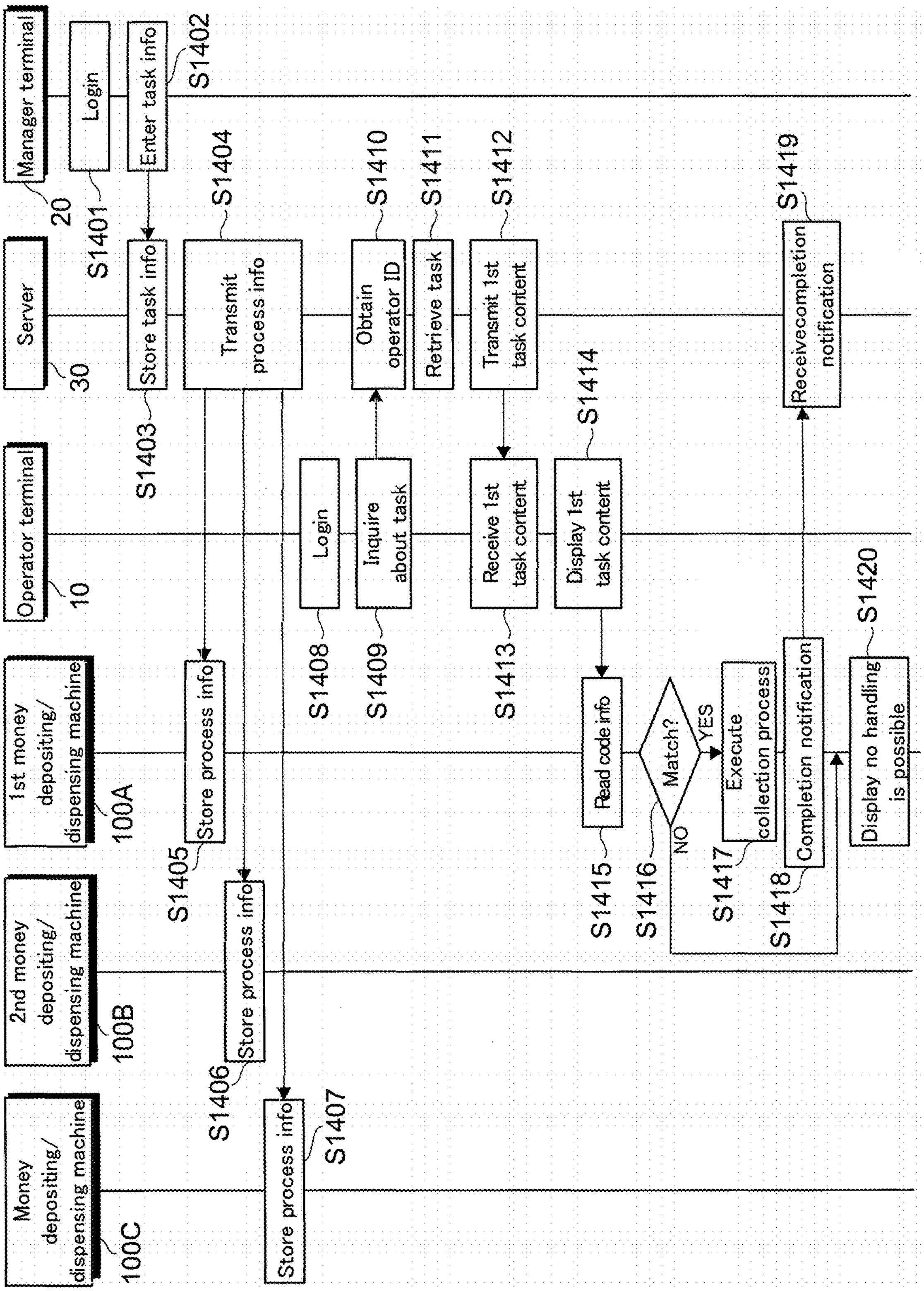
FIG. 14 is an example sequence chart for business support provided by the system according to the second embodiment.
Figure 15:
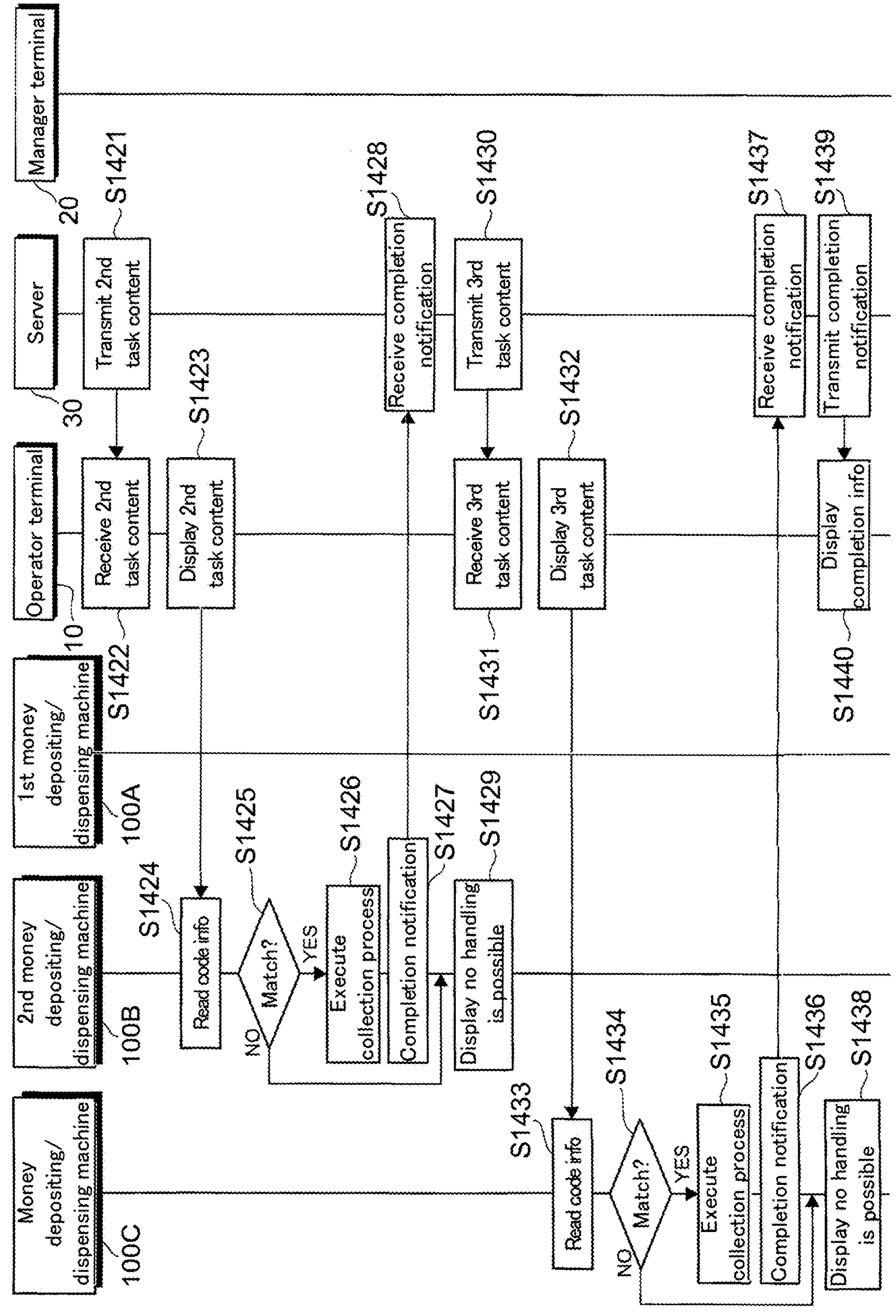
FIG. 15 is an example sequence chart for business support provided by the system according to the second embodiment.

FIGS. 14 and 15 are example sequence charts for business support provided by the system 2 according to the second embodiment.

FIG. 16 shows example information stored in a memory.

FIGS. 14 and 15 are sequence charts for a case in which an operator B collects money from the first money depositing/dispensing machine 100A in the store X 90X, then collects money from the second money depositing/dispensing machine 100B in the store X 90X, and then collects money from the money depositing/dispensing machine 100C in the store Y 90Y.

First, the manager logs into the manager terminal 20 to start the business support application (S1401), and then enters task information including task content for the operator and an identifier of the operator terminal 10 (S1402). For example, the manager may enter the information using the manager terminal 20 that is installed in a headquarters center of the security company.

Upon the manager completing the entry, the task information is transmitted from the manager terminal 20 to the server 30 and stored in the memory 32 of the server 30 (S1403). By way of example, FIG. 16 illustrates task information that is stored in the memory 32 in response to the manager entering information in step S1402 specifying that the task content on May 1, 2021 for the operator B is to collect sales proceeds from the first money depositing/dispensing machine 100A and then from the second money depositing/dispensing machine 100B installed in the store X 90X, and then to collect sales proceeds from the money depositing/dispensing machine 100C installed in the store Y 90Y, and that the operator B is allowed to carry the operator terminal 10 of unit No. 2.

The server 30 transmits process information to each target device stored in the memory 32, where the process information includes process content to be executed by the device corresponding to the task content stored in association with the device, as well as the identifier of the operator terminal 10 stored in association with the task content (S1404). This transmission is done by the transmitting circuitry 312. For example, when the memory 32 stores the task content shown in FIG. 16, the transmitting circuitry 312 of the server 30 transmits, to the first money depositing/dispensing machine 100A, the process information including a collection process and the identifier of the operator terminal 10 of unit No. 2, in order for the operator B carrying the operator terminal 10 of unit No. 2 to perform the task of collecting money from the first money depositing/dispensing machine 100A in the store X 90X. In the first money depositing/dispensing machine 100A, the control circuitry 102 receives the process information via the communication circuitry 105 and stores it in the memory 106 (S1405). Also, the transmitting circuitry 312 of the server 30 transmits, to the second money depositing/dispensing machine 100B, the process information including a collection process and the identifier of the operator terminal 10 of unit No. 2, in order for the operator B carrying the operator terminal 10 of unit No. 2 to perform the task of collecting money from the second money depositing/dispensing machine 100B in the store X 90X. In the second money depositing/dispensing machine 100B, the control circuitry 102 receives the process information via the communication circuitry 105 and stores it in the memory 106 (S1406). Also, the transmitting circuitry 312 of the server 30 transmits, to the money depositing/dispensing machine 100C, the process information including a collection process and the identifier of the operator terminal 10 of unit No. 2, in order for the operator B carrying the operator terminal 10 of unit No. 2 to perform the task of collecting money from the money depositing/dispensing machine 100C in the store Y 90Y. In the money depositing/dispensing machine 100C, the control circuitry 102 receives the process information via the communication circuitry 105 and stores it in the memory 106 (S1407).

For example, the processes from S1401 to S1407 may be performed by the time when the operator B starts the work for the day.

The operator logs into the operator terminal 10 to start the business support application (S1408), and then inquires the server 30 about the task content (S1409).

The server 30 receives the operator ID and the identifier of the operator terminal 10 transmitted from the operator terminal 10 (S1410). Then, when these received operator ID and identifier of the operator terminal 10 match the operator ID and the identifier of the operator terminal 10 stored in the memory 32, the server 30 retrieves the task content for the operator stored in the memory 32 (S1411). Then, the server 30 transmits, to the operator terminal 10, information about the content of the first task for the operator (S1412). For example, the server 30 transmits, to the operator terminal 10 carried by operator B, information indicating that the first task for the operator B is to collect money from the first money depositing/dispensing machine 100A in the store X 90X. Note that the server 30 may transmit information indicative of all processes for the operator B and the status of each process (e.g., processed, unprocessed, etc.) stored in the memory 32.

Upon receiving the information about the content of the first task transmitted from the server 30 (S1413), the operator terminal 10 displays that task content on the operational display 13 and also displays code information (e.g., QR Code®) on the operational display 13 to be read by the target device on which to perform the task (S1414). The task content and the code information to be read by the target device are caused to be displayed on the operational display 13 by the display control circuitry 114. The code information is generated by the generating circuitry 113.

Figure 17:
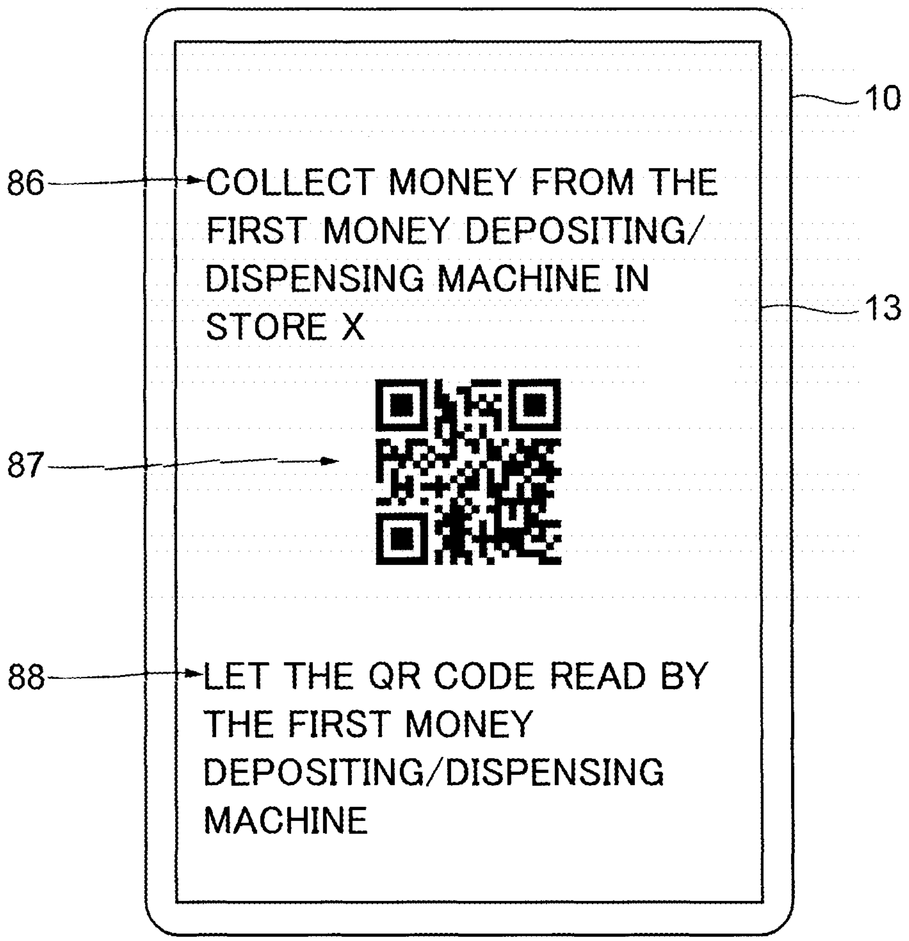
FIG. 17 shows example content displayed on an operational display of the operator's terminal.

FIG. 17 shows example content displayed on the operational display 13 of the operator terminal 10.

For example, in this sequence, the display control circuitry 114 causes the operational display 13 to present a text 86 "Collect money from the first money depositing/dispensing machine in store X" in order to prompt the operator to collect money from the first money depositing/dispensing machine 100A in the store X 90X, which is the task content. Additionally, the display control circuitry 114 causes the operational display 13 to display thereon code information 87 (QR Code® in FIG. 17) to be read by the reader 195 of the first money depositing/dispensing machine 100A, and also causes the operational display 13 to present a text 88 "Let the QR code read by the first money depositing/dispensing machine" in order to prompt the operator to let the code information 87, displayed on the operational display 13, read by the reader 195 of the first money depositing/dispensing machine 100A.

The operator acts according to the instructions displayed on the operational display 13 of the operator terminal 10. In this sequence, the operator B goes to the location where the first money depositing/dispensing machine 100A is installed and lets the reader 195 of the first money depositing/dispensing machine 100A read the code information 87 displayed on the operational display 13. Thus, the reader 195 of the first money depositing/dispensing machine 100A reads the code information 87 displayed on the operational display 13 of the operator terminal 10 of the operator B (S1415).

The first money depositing/dispensing machine 100A then determines whether the information contained in the read code information 87 matches pre-stored information (S1416). For example, the first money depositing/dispensing machine 100A determines whether there is any task stored in association with the identifier of the operator terminal 10 (S1416). If there is such a task (YES in S1416), the first money depositing/dispensing machine 100A executes the collection process that is stored in association with the identifier of the operator terminal 10 (S1417). In this sequence, the first money depositing/dispensing machine 100A causes all banknotes stored therein to be stored into the collecting cassette 140 mounted on the banknote handling assembly 110, and also unlocks the door 140*a*. Additionally, the first money depositing/dispensing machine 100A causes all coins stored therein to be stored into the collecting cassette 170, and also unlocks the door 170*a*. Note that the determination in S1416 does not necessarily require the identifier of the operator terminal 10, and any other information that can identify the task may be used. For example, the first money depositing/dispensing machine 100A may pre-store transaction serial numbers and determine whether the transaction serial number contained in the read code information 87 matches a pre-stored transaction serial number, and in response to a match being found, may execute a task that is stored in association with the matching transaction serial number.

Upon completion of the task, the first money depositing/dispensing machine 100A transmits a completion notification to the server 30 (S1418). Thus, the server 30 receives the notification that the collection process at the first money depositing/dispensing machine 100A has been completed (S1419). Note that the operator B opens the door 140*a* of the first money depositing/dispensing machine 100A to remove the collecting cassette 140 and opens the door 170*a* of the machine 100A to remove the collecting cassette 170, and loads the removed collecting cassettes 140 and 170 onto a vehicle, for example. In this way, the operator B completes the first task of collecting money from the first money depositing/dispensing machine 100A.

On the other hand, if it is determined in S1416 that there is no task stored in association with the identifier of the operator terminal 10 (NO in S1416), the first money depositing/dispensing machine 100A displays, on the operational display 104, a notification that no handling is possible (S1420). Alternatively, the first money depositing/dispensing machine 100A may transmit, via the server 30, a notification to the operator terminal 10 that no handling is possible. Note that in the process of S1416, if a closing process (store operation) for the first money depositing/dispensing machine 100A has not been performed, the first money depositing/dispensing machine 100A may display a notification that the code information 87 cannot be read or the money cannot be collected even though the code information 87 is read.

Upon receiving the completion notification from the first money depositing/dispensing machine 100A (S1419), the server 30 transmits, to the operator terminal 10, information about the content of the second task for the operator (S1421). For example, the server 30 transmits, to the operator terminal 10 carried by the operator B, information indicating that the second task for the operator B is to collect money from the second money depositing/dispensing machine 100B in the store X 90X.

Upon receiving the information about the content of the second task transmitted from the server 30 (S1422), the operator terminal 10 displays that task content on the operational display 13 and also displays code information on the operational display 13 to be read by the target device on which to perform the task (S1423).

The operator acts according to the instructions displayed on the operational display 13 of the operator terminal 10. In this sequence, the operator B goes to the location where the second money depositing/dispensing machine 100B is installed and lets the reader 195 of the second money depositing/dispensing machine 100B read the code information displayed on the operational display 13. Thus, the reader 195 of the second money depositing/dispensing machine 100B reads the code information displayed on the operational display 13 of the operator terminal 10 of the operator B (S1424).

The second money depositing/dispensing machine 100B then determines whether the information contained in the read code information matches pre-stored information (S1425). Specifically, the second money depositing/dispensing machine 100B determines whether there is any task stored in association with the identifier of the operator terminal 10 (S1425). If there is such a task (YES in S1425), the second money depositing/dispensing machine 100B executes a process that is pre-stored in association with the identifier of the operator terminal 10 (S1426). In this sequence, the second money depositing/dispensing machine 100B executes the collection process similar to the collection process executed by the first money depositing/dispensing machine 100A in S1417 described above. Note that in the process of S1425, if a closing process (store operation) for the second money depositing/dispensing machine 100B has not been performed, the second money depositing/dispensing machine 100B may display a notification that the code information cannot be read or the money cannot be collected even though the code information is read.

Upon completion of the process, the second money depositing/dispensing machine 100B transmits a completion notification to the server 30 (S1427). Thus, the server 30 receives the notification that the collection task at the second money depositing/dispensing machine 100B has been completed (S1428). Note that the operator B opens the door 140*a* of the second money depositing/dispensing machine 100B to remove the collecting cassette 140 and opens the door 170*a* of the machine 100B to remove the collecting cassette 170, and loads the removed collecting cassettes 140 and 170 onto a vehicle, for example. In this way, the operator B completes the second task of collecting money from the second money depositing/dispensing machine 100B.

On the other hand, if it is determined in S1425 that there is no task stored in association with the identifier of the operator terminal 10 (NO in S1425), the second money depositing/dispensing machine 100B displays, on the operational display 104, a notification that no handling is possible (S1429). Alternatively, the second money depositing/dispensing machine 100B may transmit, via the server 30, a notification to the operator terminal 10 that no handling is possible.

Upon receiving the completion notification from the second money depositing/dispensing machine 100B (S1428), the server 30 transmits, to the operator terminal 10, information about the content of the third task for the operator (S1430). For example, the server 30 transmits, to the operator terminal 10 carried by the operator B, information indicating that the third task for the operator B is to collect money from the money depositing/dispensing machine 100C in the store Y 90Y.

Upon receiving the information about the content of the third task transmitted from the server 30 (S1431), the operator terminal 10 displays that task content on the operational display 13 and also displays code information on the operational display 13 to be read by the target device on which to perform the task (S1432).

The operator acts according to the instructions displayed on the operational display 13 of the operator terminal 10. In this sequence, the operator B goes to the location where the money depositing/dispensing machine 100C is installed and lets the reader 195 of the money depositing/dispensing machine 100C read the code information displayed on the operational display 13. Thus, the reader 195 of the money depositing/dispensing machine 100C reads the code information displayed on the operational display 13 of the operator terminal 10 of the operator B (S1433).

The money depositing/dispensing machine 100C then determines whether the information contained in the read code information matches pre-stored information (S1434). Specifically, the money depositing/dispensing machine 100C determines whether there is any task stored in association with the identifier of the operator terminal 10 (S1434). If there is such a task (YES in S1434), the money depositing/dispensing machine 100C executes the process that is pre-stored in association with the identifier of the operator terminal 10 (S1435). In this sequence, the money depositing/dispensing machine 100C executes the collection process similar to the collection process executed by the first money depositing/dispensing machine 100A in S1417 described above. Note that in the process of S1434, if a closing process (store operation) for the money depositing/dispensing machine 100C has not been performed, the money depositing/dispensing machine 100C may display a notification that the code information cannot be read or the money cannot be collected even though the code information is read.

Upon completion of the process, the money depositing/dispensing machine 100C transmits a completion notification to the server 30 (S1436). Thus, the server 30 receives the notification that the collection task at the money depositing/dispensing machine 100C has been completed (S1437). Note that the operator B opens the door 140*a* of the money depositing/dispensing machine 100C to remove the collecting cassette 140 and opens the door 170*a* of the machine 100C to remove the collecting cassette 170, and loads the removed collecting cassettes 140 and 170 onto a vehicle, for example. In this way, the operator B completes the third task of collecting money.

On the other hand, if it is determined in S1434 that there is no task stored in association with the identifier of the operator terminal 10 (NO in S1434), the money depositing/dispensing machine 100C displays, on the operational display 104, a notification that no handling is possible (S1438). Alternatively, the money depositing/dispensing machine 100C may transmit, via the server 30, a notification to the operator terminal 10 that no handling is possible.

Upon receiving the completion notification from the money depositing/dispensing machine 100C (S1437), the server 30 transmits, to the operator terminal 10, a notification that the task has been completed (S1439). Upon receiving this notification that the task has been completed, the operator terminal 10 displays task completion information on the operational display 13 (S1440).

In the system 2 described above, the operator can cause a target device to execute a collection process by letting it read code information displayed on the operational display 13 of the operator terminal 10 that he/she carries, which eliminates the need for carrying a key or the like to execute the collection process at the target device. This eliminates the complexity of carrying a key or the like and also provides increased security. Also, in the case of collecting sales proceeds from multiple money depositing/dispensing machines in one day, the operator does not need to search for the key or the like corresponding to the money depositing/dispensing machine 100 on which he/she is about to perform a collection task, from among multiple keys or the like corresponding to the respective multiple money depositing/ dispensing machines 100. Thus, the system 2 eliminates the need for sorting keys or like by collection route, store, machine number, etc., and also can do away with management tasks associated with, e.g., storing, delivering, and receiving keys or the like.

Also, the system 2 allows the task content (e.g., collecting money from the first money depositing/dispensing machine 100A in the store X 90X) to be displayed on the operational display 13 of the operator terminal 10 carried by the operator. As such, the system 2 can teach the task content to the operator. Since the operator can perform the tasks as he/she views the task content displayed on the operational display 13 of the operator terminal 10, there is no need for the operator to memorize the order in which to collect sales proceeds from target devices. In addition to the task content, the operational display 13 of the operator terminal 10 may also be caused to display a route to the store 90 where a target device on which to perform a task is installed. This eliminates the need for the operator to memorize the route. In addition, the manager does not need to teach routes even when, for example, operators are frequently replaced or the number of operators is rapidly increased. As such, the use of the system 2 can reduce training costs.

The money depositing/dispensing machine 100 also transmits execution results of the collection process to the server 30. Thus, the system 2 allows the manager to sequentially check the task history by viewing the task history stored in the server 30. This allows the manager to know the progress of each task. The manager can also set a time, e.g., an end time, by which a task should be completed, and if the task has not been completed by the end time, the server 30 may notify the operator and/or the manager that the end time has been passed.

The sequence described with reference to FIGS. 14 and 15 is an example of tasking an operator with routine operations that need to be performed on a daily basis. Additionally, the system 2 may be used to task an operator with non-routine operations that needs to be performed in the event of occurrence of an error situation where, for example, a traffic incident or the like prevents another operator from performing a collection task.

A sequence to follow when using the system 2 to task an operator with non-routine operations is described below.

Figure 18:
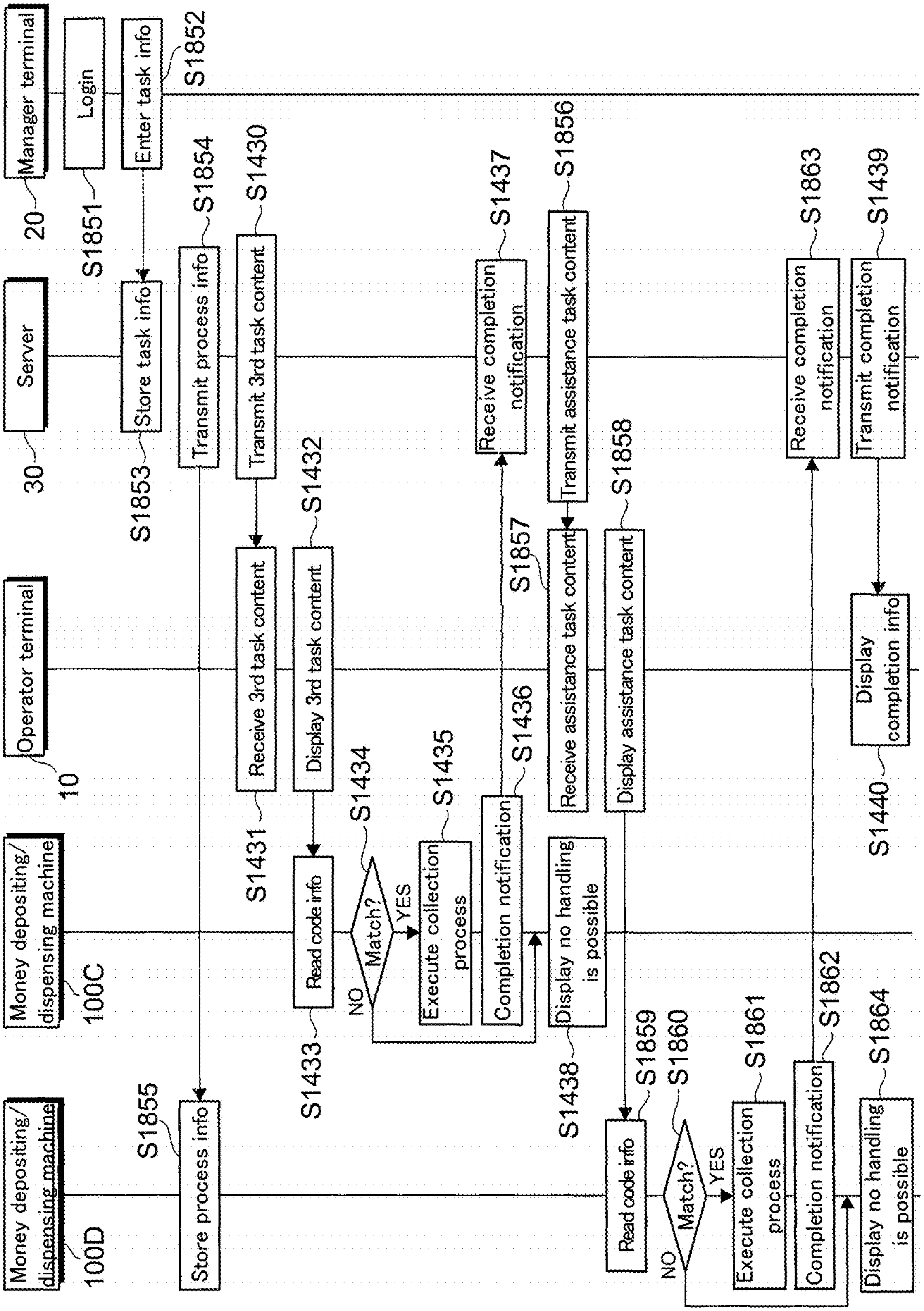
FIG. 18 is an example sequence chart for business support for non-routine business operations provided by the system.

FIG. 18 is an example sequence chart for business support for non-routine operations provided by the system 2.

When an operator of a security company is unable to perform his/her assigned task within a deadline, the operator informs the headquarter center of this fact. For example, when an operator C, who is different from the operator B, is tasked with collecting sales proceeds from a money depositing/dispensing machine 100D installed in a store Z, but is unable to go to the store Z to perform the collection task within a deadline due to a traffic accident or other traffic incidents, the operator C informs the headquarters center that he/she is unable to perform the task of collecting sales proceeds from the money depositing/dispensing machine 100D. This communication may be done by telephone, e-mail, or the like.

At the headquarters center, the manager selects an operator who will be able to perform the operation within the deadline as a substitute for the operator who is unable to perform the operation, and instructs the selected operator to perform the operation. Examples of such substitute operators include an operator who has already completed his/her assigned operation and an operator who is scheduled to go to a location close to where a target device on which to perform the task is installed and will be able to perform the task within the deadline. For example, in the case where the manager is informed by the operator C that he/she is unable to perform the task of collecting sales proceeds from the money depositing/dispensing machine 100D in the store Z within the deadline, and the worker B has already completed his/her assigned operation (the collection task described with reference to FIGS. 14 and 15), then the manager selects the operator B as a substitute for the operator C and instructs the operator B to perform the task of collecting sales proceeds from the money depositing/dispensing machine 100D in the store Z.

Note that when an operator is unable to perform his/her assigned operation within a deadline, the operator may be able to select another operator on his/her own and instruct the selected operator to perform the operation that he/she is unable to perform on his/her own within the deadline. For example, the operator C may be able to directly select the operator B and transfer his/her own task to the operator terminal 10 of the operator B.

A sequence to follow when using the system 2 to task an operator with non-routine operations is described below.

FIG. 18 is an example sequence chart for business support for non-routine operations provided by the system 2. Like reference numerals will be used to denote the same processes as those described with reference to FIGS. 14 and 15, and a detailed description thereof will be omitted. FIG. 18 illustrates a case where the manager, in response to being informed by the operator C that he/she is unable to perform the task of collecting sales proceeds from the money depositing/dispensing machine 100D in the store Z within the deadline, selects the operator B who is scheduled to go to the store Y located near the store Z, as a substitute for the operator C.

The manager logs into the manager terminal 20 to start the business support application (S1851), and then enters task information about the task for the operator B of collecting sales proceeds from the money depositing/dispensing machine 100D in the store Z (S1852). Upon the manager completing the entry, the task information is transmitted from the manager terminal 20 to the server 30 and stored in the memory 32 of the server 30 (S1853). Then, the server 30 transmits process information to the target device stored in the memory 32, where the process information includes process content to be executed by the device corresponding to the task content stored in association with the device, as well as the identifier of the operator terminal 10 stored in association with the task content (S1854). The transmitting circuitry 312 of the server 30 transmits, to the money depositing/dispensing machine 100D, the process information including a collection process and the identifier of the operator terminal 10 of unit No. 2, in order for the operator B carrying the operator terminal of unit No. 2 to perform the task of collecting money from the money depositing/dispensing machine 100D in the store Z. In the money depositing/dispensing machine 100D, the control circuitry 102 receives the process information via the communication circuitry 105 and stores it in the memory 106 (S1855).

Upon receiving the completion notification from the money depositing/dispensing machine 100C (S1437), the server 30 transmits, to the operator terminal 10, information about the content of the assistance task for the operator B (S1856). For example, the server 30 transmits, to the operator terminal 10 carried by operator B, information indicating that the assistance task for the operator B is to collect money from the money depositing/dispensing machine 100D in the store Z.

Upon receiving the information about the content of the assistance task transmitted from the server 30 (S1857), the operator terminal 10 displays that task content on the operational display 13 and also displays code information on the operational display 13 to be read by the target device on which to perform the task (S1858).

The operator B acts according to the instructions displayed on the operational display 13 of the operator terminal 10. In this sequence, the operator B goes to the store Z and lets the reader 195 of the money depositing/dispensing machine 100D read the code information displayed on the operational display 13. Thus, the reader 195 of the money depositing/dispensing machine 100D reads the code information displayed on the operational display 13 of the operator terminal 10 of the operator B (S1859).

The money depositing/dispensing machine 100D in the store Z then determines whether the information contained in the read code information matches pre-stored information (S1860). Specifically, the money depositing/dispensing machine 100D determines whether there is any task stored in association with the identifier of the operator terminal 10 (S1860). If there is such a task (YES in S1860), the money depositing/dispensing machine 100D in the store Z executes the process that is pre-stored in association with the identifier of the operator terminal 10 (S1861). In this sequence, the money depositing/dispensing machine 100D in the store Z executes the collection process similar to the collection process executed by the first money depositing/dispensing machine 100A in S1417 described above.

Upon completion of the process, the money depositing/dispensing machine 100D in the store Z transmits a completion notification to the server 30 (S1862). Thus, the server 30 receives the notification that the collection task at the money depositing/dispensing machine 100D in the store Z has been completed (S1863). Note that the operator B opens the door 140*a* of the money depositing/dispensing machine 100D to remove the collecting cassette 140 and opens the door 170*a* of the machine 100D to remove the collecting cassette 170, and loads the removed collecting cassettes 140 and 170 onto a vehicle, for example. In this way, the operator B completes the assistance task of collecting money.

On the other hand, if it is determined in S1860 that there is no task stored in association with the identifier of the operator terminal 10 (NO in S1860), the money depositing/dispensing machine 100D displays, on the operational display 104, a notification that no handling is possible (S1864). Alternatively, the money depositing/dispensing machine 100D may transmit, via the server 30, a notification to the operator terminal 10 that no handling is possible.

Upon receiving the completion notification from the money depositing/dispensing machine 100D (S1863), the server 30 transmits, to the operator terminal 10, a notification that the task has been completed (S1439). Upon receiving this notification that the task has been completed, the operator terminal 10 displays task completion information on the operational display 13 (S1440).

The system 2 described above eliminates the need for operators to carry a key or the like to perform a collection process on the target device, which makes it possible to have another operator perform a collection task in place of an operator who is unable to perform the collection task due to, e.g., a traffic incident or the like.

In the above example, the server 30 and a target device for a task (e.g., the money depositing/dispensing machine 100) can communicate with each other via the network 40, so that the server 30 transmits the process information to the target device for the task on e.g., the very day of the collection task (e.g., in S1404). On the other hand, when the server 30 and the target device for the task (e.g., the money depositing/dispensing machine 100) cannot communicate with each other via the network 40, authentication information to permit process execution by the target device for the task, or in order words, to cause the target device for the task to execute a process, may be specified in advance, and the server 30 may transmit that authentication information to the operator terminal 10. For example, a certain collection code may be specified in advance as the authentication information to allow the money depositing/dispensing machine 100, which is the target device for the task, to perform a collection process, and the money depositing/dispensing machine 100 may execute the collection process if the collection code is included in the code information displayed on the operation display 13 of the operator terminal 10 and read by the reader 195 of the money depositing/dispensing machine 100. For example, a collection code for the first money depositing/dispensing machine 100A may be "1234," a collection code for the second money depositing/dispensing machine 100B may be "5555," and a collection code for the money depositing/dispensing machine 100C may be "8823." Note that the collection code is not limited to being included in the code information displayed on the operational display 13 of the operator terminal 10; the collection code may be entered by an operator on the operational display 104 of the money depositing/dispensing machine 100.

Figure 19:
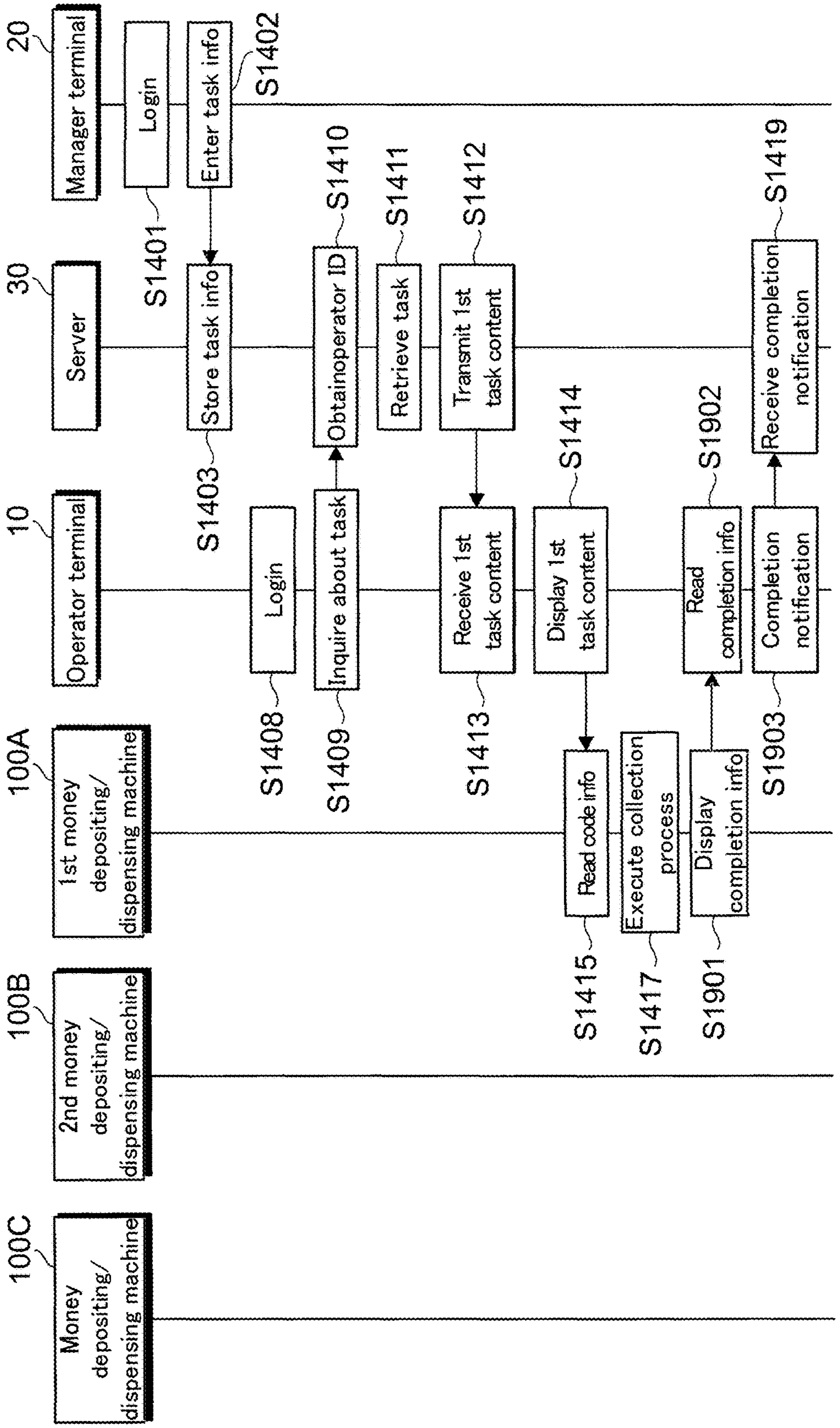
FIG. 19 is an example sequence chart for business support when communication between the server and a target device for a task is not possible.
Figure 20:
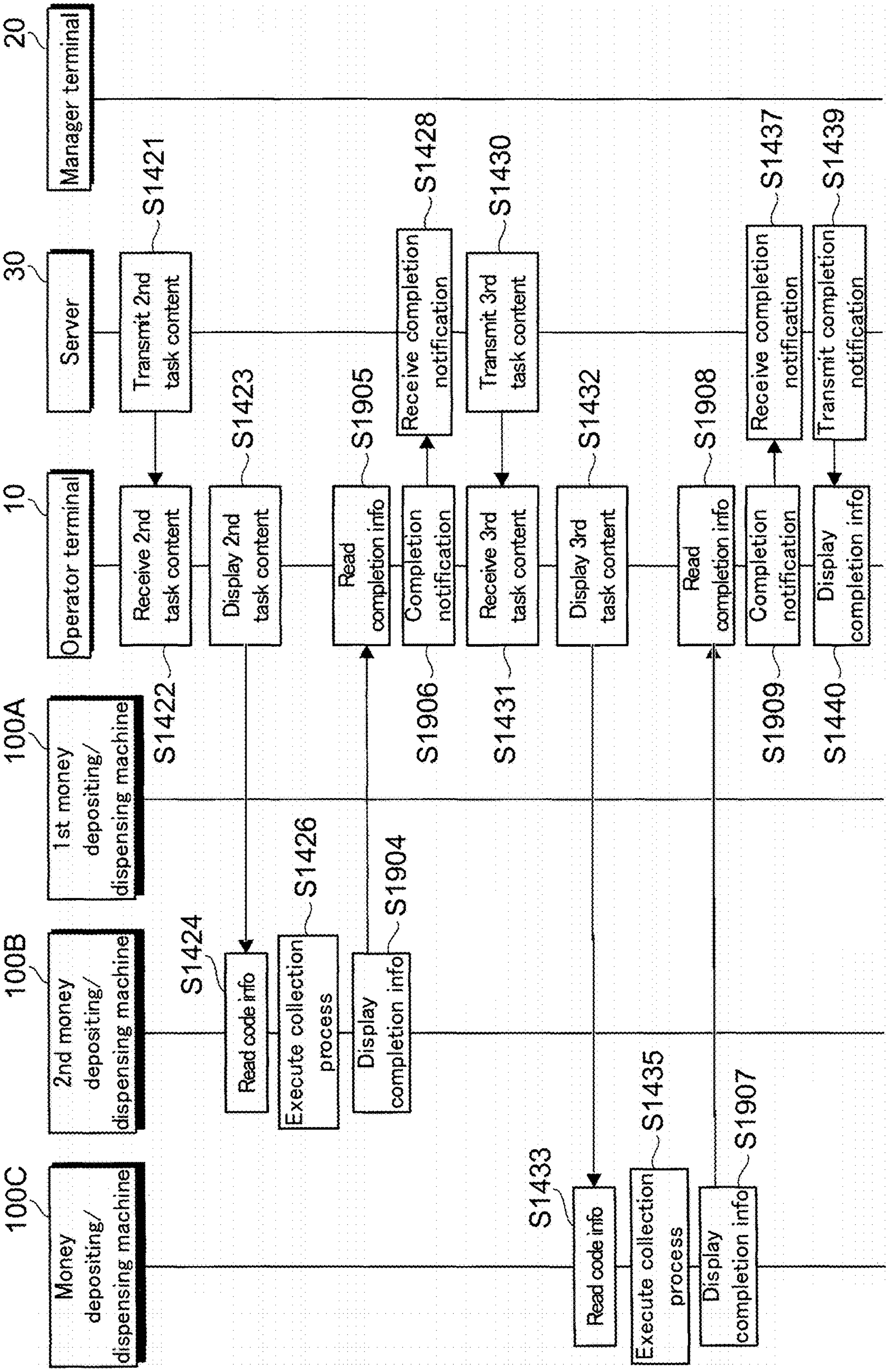
FIG. 20 is an example sequence chart for business support when communication between the server and a target device for a task is not possible.

FIG. 19 and FIG. 20 are example sequence charts for business support when communication between the server 30 and a target device for a task is not possible. Like reference numerals will be used to denote the same processes as those described with reference to FIGS. 14 and 15, and a detailed description thereof will be omitted.

After storing information entered by the manager in the memory 32 (S1403), the server 30 does not transmit any process information to a target device(s) for a task(s) stored in the memory 32. Then, in response to the operator inquiring about a task(s) (S1409), the server 30 transmits information about the task content to the operator terminal 10 (S1412). Upon receiving the information about the content of the first task transmitted from the server (S1413), the operator terminal 10 displays that task content on the operational display 13 and also displays code information (e.g., QR Code®) on the operational display 13 to be read by the target device on which to perform the task (S1414). The code information displayed on the operational display 13 in S1414 includes the above collection code (e.g., "1234") to permit execution of the collection process by the first money depositing/dispensing machine 100A, or in other words, to cause the first money depositing/dispensing machine 100A to execute the collection process.

In the sequence diagram shown in FIG. 19, in response to the reader 195 of the first money depositing/dispensing machine 100A reading the code information displayed on the operational display 13 of the operator terminal 10 of the operator B (S1415), the first money depositing/dispensing machine 100A executes the collection process (S1417). Upon completion of the task, the first money depositing/dispensing machine 100A displays information indicating the task completion (which may include detailed information such as the amount of money collected) on the operational display 104 in the form of code information (e.g., QR Code®) or the like (S1901). Then, the operator terminal 10 reads the code information or the like displayed on the operational display 104 to recognize that the task has been completed (S1902), and transmits to the server 30*a* notification that the task included in the code information has been completed (S1903). The server 30 receives the notification from the operator terminal 10 that the collection process at the first money depositing/dispensing machine 100A has been completed (S1419). The first money depositing/dispensing machine 100A may transmit the information indicating the task completion to the operator terminal 10 by short-range wireless communication or the like.

Upon receiving the completion notification from the first money depositing/dispensing machine 100A (S1419), the server 30 transmits, to the operator terminal 10, information about the content of the second task for the operator (S1421). Upon receiving the information about the content of the second task transmitted from the server 30 (S1422), the operator terminal 10 displays that task content on the operational display 13 and also displays code information on the operational display 13 to be read by the target device on which to perform the task (S1423). The code information displayed in S1423 includes the above collection code (e.g., "5555") to cause the second money depositing/dispensing machine 100B to execute the collection process.

In response to the reader 195 of the second money depositing/dispensing machine 100B reading the code information displayed on the operational display 13 of the operator terminal 10 of the operator B (S1424), the second money depositing/dispensing machine 100B executes the collection process (S1426). Upon completion of the task, the second money depositing/dispensing machine 100B displays information indicating the task completion (which may include detailed information such as the amount of money collected) on the operational display 104 in the form of code information (e.g., QR Code®) or the like (S1904). Then, the operator terminal 10 reads the code information or the like displayed on the operational display 104 to recognize that the task has been completed (S1905), and transmits to the server 30 a notification that the task included in the code information has been completed (S1906). The server 30 receives the notification from the operator terminal that the collection process at the second money depositing/dispensing machine 100B has been completed (S1428).

Upon receiving the completion notification from the second money depositing/dispensing machine 100B (S1428), the server 30 transmits, to the operator terminal 10, information about the content of the third task for the operator (S1430). Upon receiving the information about the content of the third task transmitted from the server 30 (S1431), the operator terminal 10 displays that task content on the operational display 13 and also displays code information on the operational display 13 to be read by the target device on which to perform the task (S1432). The code information displayed in S1432 includes the above collection code (e.g., "8823") to cause the money depositing/dispensing machine 100C to execute the collection process.

In response to the reader 195 of the money depositing/dispensing machine 100C reading the code information displayed on the operational display 13 of the operator terminal of the operator B (S1433), the money depositing/dispensing machine 100C executes the collection process (S1435). Upon completion of the task, the money depositing/dispensing machine 100C displays information indicating the task completion (which may include detailed information such as the amount of money collected) on the operational display 104 in the form of code information (e.g., QR Code®) or the like (S1907). Then, the operator terminal 10 reads the code information or the like displayed on the operational display 104 to recognize that the task has been completed (S1908), and transmits to the server 30 a notification that the task included in the code information has been completed (S1909). The server 30 receives the notification from the operator terminal 10 that the collection process at the money depositing/dispensing machine 100C has been completed (S1437).

Even when the server 30 and the target devices for tasks cannot communicate, the above control ensures that the operator can cause each target device to execute the collection process by letting it read the code information displayed on the operational display 13 of the operator terminal 10 that he/she carries. This can reduce the capital expenditure to enable communication between the server 30 and the target devices for tasks. The above control also makes it possible to have another operator perform the collection task in place of an operator who is unable to perform the collection task due to, e.g., a traffic incident or the like.

REFERENCE SIGNS LIST

1, 2 Business support system
10 Operator terminal
11, 21, 31, 102, 202 Control circuitry
13 Operational display
20 Manager terminal
30 Business support server
40 Network
100 Money depositing/dispensing machine
111, 211, 311 Receiving circuitry
112, 212, 312 Transmitting circuitry
195, 295 Reader
200 Money change machine

The invention claimed is:

1. A system, comprising:

an operator terminal including control circuitry, a memory, communication circuitry, an operational display configured to display code information, and generating circuitry configured to generate the code information based on information received from a server, wherein the code information is a QR code or a bar code, and the operational display includes a touch panel; and the server including circuitry configured to:

accept task information including content of a plurality of tasks and an identifier of the operator terminal, the plurality of tasks to be performed by a plurality of money processing machines, wherein each money processing machine includes control circuitry, communication circuitry, a memory, an authenticator configured to authenticate operator information, an operational display, and a code reader configured to read the code information;

accept input regarding the content of the plurality of tasks and an order in which the plurality of tasks is to be performed;

transmit the task information to the operator terminal; and transmit process information to a money processing machine of the plurality of money processing machines, the process information including content of a task of the plurality of tasks, the identifier, and operator information for identifying an operator who carries the operator terminal, wherein the communication circuitry of the operator terminal is configured to receive the task information, the control circuitry of the operator terminal is configured to control, based on the task information, the operational display of the operator terminal to display the content of the task to be performed by the money processing machine, the generating circuitry of the operator terminal is configured to output a task signal to display the code information on the operational display of the operator terminal, the task signal including the identifier of the operator terminal and the operator information, to perform the task:

the communication circuitry of the money processing machine is configured to obtain the process information transmitted from the server;

the code reader of the money processing machine is configured to read the task signal output by the generating circuitry of the operator terminal by reading the code information displayed on the operational display of the operator terminal;

the control circuitry of the money processing machine is configured to execute a process included in the process information when content of a task identified by the task signal matches content of a task identified by the obtained process information and when the operator information included in the task signal matches the operator information included in the obtained process information; and the communication circuitry of the money processing machine is configured to transmit results of execution of the process to the server, the process executed by the control circuitry of the money processing machine includes unlocking an electromagnetic locking mechanism provided on a door of the money processing machine, the money processing machine is configured to limit execution of the process to a single time for a single instance of the task signal, the operational display of the money processing machine is configured to display a completion code upon completion of the process, the operator terminal is configured to read the completion code to verify task completion, and the money processing machine further includes a banknote handling assembly configured to handle banknotes and a coin handling assembly configured to handle coins.

2. The system according to claim 1, wherein the communication circuitry of the money processing machine is configured to transmit a notification to the server when a remaining amount of money in the money processing machine becomes equal to or less than a specific threshold.

3. The system according to claim 1, wherein the task information includes an instruction to mount a storage cassette on a cassette mounting unit of the money processing machine.

4. The system according to claim 1, wherein the operational display of the operator terminal is configured to display a guide route from a current location of the operator terminal to an installation location of the money processing machine.

5. The system according to claim 1, wherein the operational display of the operator terminal is configured to display, as the code information, a single code corresponding to a plurality of tasks to be performed on the money processing machine.

6. The system according to claim 1, wherein the memory of the money processing machine stores authentication information in advance, and the control circuitry of the money processing machine is configured to execute the process when the task signal includes a matching collection code, even if the money processing machine is offline relative to the server.

7. The system according to claim 1, wherein the operator terminal includes a global positioning system (GPS) function to acquire location information of the operator terminal.

8. The system according to claim 1, wherein the authenticator of the money processing machine is configured to authenticate the operator before the code reader reads the code information displayed on the operational display of the operator terminal, and the control circuitry of the money processing machine is configured to execute the process when an operator authenticated by the authenticator matches an operator identified by the code information read by the code reader.

9. The system according to claim 1, wherein the server is configured to receive an operator ID and the identifier of the operator terminal from the operator terminal, verify that the received operator ID and the identifier match an operator ID and an identifier stored in a memory of the server, and transmit the task information to the operator terminal in response to the verification.

10. The system according to claim 1, wherein, upon receiving from the money processing machine a completion notification indicating that the process has been completed, the server is configured to transmit to the operator terminal information about a next task of the plurality of tasks.

11. The system according to claim 1, wherein when the task signal read by the code reader does not match any process information stored in the memory of the money processing machine, the money processing machine is configured to display, on the operational display of the money processing machine, a notification that no handling is possible.

12. The system according to claim 1, wherein when the code reader of a non-target money processing machine of the plurality of money processing machines reads the code information displayed on the operational display of the operator terminal, the non-target money processing machine is configured to display, on the operational display of the non-target money processing machine, an indication that the non-target money processing machine is not a target device for the task, and identification information of a target money processing machine for the task.

13. The system according to claim 1, wherein the money processing machine further includes a cassette mounting unit for detachable mounting of a storage cassette, and when the storage cassette is not mounted on the cassette mounting unit, the money processing machine is configured to display, on the operational display of the money processing machine, a prompt to mount the storage cassette on the cassette mounting unit.

14. The system according to claim 1, further comprising a manager terminal, wherein in response to the money processing machine detecting a predetermined event, the money processing machine is configured to notify the server of the predetermined event, and the server is configured to transmit a push notification to the manager terminal informing the manager terminal of the predetermined event.

15. The system according to claim 1, wherein the server is configured to store a task history including results of execution transmitted from the money processing machine, store an end time by which a task is to be completed, and notify at least one of the operator terminal and a manager terminal when the task has not been completed by the end time.

16. The system according to claim 1, wherein the authenticator of the money processing machine is configured to authenticate the operator based on biometric information of the operator.

17. The system according to claim 1, wherein the banknote handling assembly includes a transporter provided with recognition circuitry configured to recognize at least a denomination and authenticity of banknotes transported by the transporter.

18. A method, comprising:

accepting, by a server, task information including content of a plurality of tasks and an identifier of an operator terminal, wherein the operator terminal includes control circuitry, a memory, communication circuitry, an operational display configured to display code information, and generating circuitry configured to generate the code information based on information received from the server, the code information is a QR code or a bar code, the operational display includes a touch panel, the plurality of tasks is to be performed by a plurality of money processing machines, and each money processing machine includes control circuitry, communication circuitry, a memory, an authenticator configured to authenticate operator information, an operational display, and a code reader configured to read the code information;

accepting, by the server, input regarding the content of the plurality of tasks and an order in which the plurality of tasks is to be performed;

transmitting the task information to the operator terminal;

transmitting process information to a money processing machine of the plurality of money processing machines, the process information including content of a task of the plurality of tasks, the identifier, and operator information for identifying an operator who carries the operator terminal;

receiving, by the communication circuitry of the operator terminal, the task information;

displaying, by the operational display of the operator terminal and based on the task information, the content of the task to be performed by the money processing machine;

outputting, by the generating circuitry of the operator terminal, a task signal to display the code information on the operational display of the operator terminal, the task signal including the identifier of the operator terminal and the operator information; and performing, by the money processing machine, the task by:

obtaining, by the communication circuitry of the money processing machine, the process information transmitted from the server;

reading, by the code reader of the money processing machine, the task signal output by the generating circuitry of the operator terminal by reading the code information displayed on the operational display of the operator terminal;

executing, by the control circuitry of the money processing machine, a process included in the process information when content of a task identified by the task signal matches content of a task identified by the obtained process information and when the operator information included in the task signal matches the operator information included in the obtained process information, the process including unlocking an electromagnetic locking mechanism provided on a door of the money processing machine; and transmitting, by the communication circuitry of the money processing machine, results of execution of the process to the server, wherein the money processing machine limits execution of the process to a single time for a single instance of the task signal, the operational display of the money processing machine is configured to display a completion code upon completion of the process, the operator terminal is configured to read the completion code to verify task completion, and the money processing machine further includes a banknote handling assembly configured to handle banknotes and a coin handling assembly configured to handle coins.

* * * * *